(12) United States Patent
Balasubramanian et al.

(10) Patent No.: US 11,743,866 B2
(45) Date of Patent: Aug. 29, 2023

(54) RESOURCE SELECTION METHODS FOR UNALIGNED FEEDBACK TRANSMISSIONS FOR SIDELINK CARRIER AGGREGATION

(71) Applicant: QUALCOMM Incorporated, San Diego, CA (US)

(72) Inventors: Anantharaman Balasubramanian, San Diego, CA (US); Shuanshuan Wu, San Diego, CA (US); Kapil Gulati, Belle Mead, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 223 days.

(21) Appl. No.: 17/359,157

(22) Filed: Jun. 25, 2021

(65) Prior Publication Data
US 2022/0417926 A1 Dec. 29, 2022

(51) Int. Cl.
| | |
|---|---|
| H04W 72/02 | (2009.01) |
| H04W 72/04 | (2023.01) |
| H04L 5/00 | (2006.01) |
| H04W 72/0453 | (2023.01) |
| H04W 72/56 | (2023.01) |
| H04W 72/40 | (2023.01) |
| H04W 72/232 | (2023.01) |
| H04W 72/23 | (2023.01) |
| H04W 72/231 | (2023.01) |

(52) U.S. Cl.
CPC ............. *H04W 72/02* (2013.01); *H04L 5/001* (2013.01); *H04L 5/0092* (2013.01); *H04W 72/0453* (2013.01); *H04W 72/23* (2023.01); *H04W 72/231* (2023.01); *H04W 72/232* (2023.01); *H04W 72/40* (2023.01); *H04W 72/56* (2023.01)

(58) Field of Classification Search
CPC . H04W 72/02; H04W 72/0453; H04W 72/23; H04W 72/231; H04W 72/232; H04W 72/40; H04W 72/56; H04L 5/001; H04L 5/0092
See application file for complete search history.

(56) References Cited

U.S. PATENT DOCUMENTS

| | | | |
|---|---|---|---|
| 11,388,733 B2 * | 7/2022 | Huang | H04W 76/27 |
| 2020/0205165 A1 * | 6/2020 | Huang | H04L 1/1854 |
| 2023/0069535 A1 * | 3/2023 | Luo | H04L 5/003 |

* cited by examiner

*Primary Examiner* — Kevin C. Harper
(74) *Attorney, Agent, or Firm* — Arun Swain; Holland & Hart LLP

(57) ABSTRACT

Methods, systems, and devices for wireless communication are described. A user equipment (UE) may receive control signaling indicating a plurality of component carriers of a sidelink channel and a plurality of feedback channel configurations for the plurality of component carriers. The UE may select, based at least in part on the plurality of feedback channel configurations, a subset of the plurality of component carriers for transmission of a first sidelink message and a second sidelink message using a feedback channel alignment rule indicating to select component carriers having feedback channels aligned in time for at least a subset of a plurality of transmission time intervals. The UE may transmit the first sidelink message on a first component carrier of the subset and the second sidelink message on a second component carrier of the subset.

30 Claims, 13 Drawing Sheets

Control Signaling 220

Sidelink Messages 230

Feedback Messages 240

RESOURCE SELECTION METHODS FOR UNALIGNED FEEDBACK TRANSMISSIONS FOR SIDELINK CARRIER AGGREGATION

FIELD OF TECHNOLOGY

The following relates to wireless communication, including resource selection methods in sidelink communications.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long-Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

In some wireless communications system, a wireless device may receive feedback messages in connection with sidelink communications. The wireless device may implement resource selection for sidelink transmission based on the feedback messages. Conventional methods for such resource selection schemes may be deficient.

SUMMARY

The described techniques relate to improved methods, systems, devices, and apparatuses that support resource selection methods for unaligned feedback transmissions for sidelink carrier aggregation. Generally, the described techniques provide for sidelink resource selection in situations where sidelink feedback transmissions may be unaligned. A user equipment (UE) may receive control signaling that may indicate a plurality of component carriers of a sidelink channel and a plurality of feedback channel configurations for the plurality of component carriers. The UE may select, based on the plurality of feedback channel configurations, a subset of the plurality of component carriers for transmission of a first sidelink message and a second sidelink message using a feedback channel alignment rule that may indicate to select component carriers having feedback channels aligned in time for at least a subset of a plurality of transmission time intervals. The UE may transmit the first sidelink message on a first component carrier of the subset and the second sidelink message on a second component carrier of the subset.

A method for wireless communication at a user equipment is described. The method may include receiving control signaling indicating a set of multiple component carriers of a sidelink channel and a set of multiple feedback channel configurations for the set of multiple component carriers, selecting, based on the set of multiple feedback channel configurations, a subset of the set of multiple component carriers for transmission of a first sidelink message and a second sidelink message using a feedback channel alignment rule indicating to select component carriers having feedback channels aligned in time for at least a subset of a set of multiple transmission time intervals, and transmitting the first sidelink message on a first component carrier of the subset and the second sidelink message on a second component carrier of the subset.

An apparatus for wireless communication at a user equipment is described. The apparatus may include a processor, memory coupled with the processor, and instructions stored in the memory. The instructions may be executable by the processor to cause the apparatus to receive control signaling indicating a set of multiple component carriers of a sidelink channel and a set of multiple feedback channel configurations for the set of multiple component carriers, select, based on the set of multiple feedback channel configurations, a subset of the set of multiple component carriers for transmission of a first sidelink message and a second sidelink message using a feedback channel alignment rule indicating to select component carriers having feedback channels aligned in time for at least a subset of a set of multiple transmission time intervals, and transmit the first sidelink message on a first component carrier of the subset and the second sidelink message on a second component carrier of the subset.

Another apparatus for wireless communication at a user equipment is described. The apparatus may include means for receiving control signaling indicating a set of multiple component carriers of a sidelink channel and a set of multiple feedback channel configurations for the set of multiple component carriers, means for selecting, based on the set of multiple feedback channel configurations, a subset of the set of multiple component carriers for transmission of a first sidelink message and a second sidelink message using a feedback channel alignment rule indicating to select component carriers having feedback channels aligned in time for at least a subset of a set of multiple transmission time intervals, and means for transmitting the first sidelink message on a first component carrier of the subset and the second sidelink message on a second component carrier of the subset.

A non-transitory computer-readable medium storing code for wireless communication at a user equipment is described. The code may include instructions executable by a processor to receive control signaling indicating a set of multiple component carriers of a sidelink channel and a set of multiple feedback channel configurations for the set of multiple component carriers, select, based on the set of multiple feedback channel configurations, a subset of the set of multiple component carriers for transmission of a first sidelink message and a second sidelink message using a feedback channel alignment rule indicating to select component carriers having feedback channels aligned in time for at least a subset of a set of multiple transmission time intervals, and transmit the first sidelink message on a first component carrier of the subset and the second sidelink message on a second component carrier of the subset.

Some examples of the method, apparatuses, and non-transitory computer-readable medium described herein may further include operations, features, means, or instructions for transmitting the first sidelink message on the first component carrier of the subset and the second sidelink message on the second component carrier of the subset based on the feedback channel alignment rule indicating to select at least two of the set of multiple component carriers that each may have time-aligned feedback channels and a same feedback channel periodicity.

Some examples of the method, apparatuses, and non-transitory computer-readable medium described herein may further include operations, features, means, or instructions for transmitting the first sidelink message on the first component carrier during a first transmission time interval and the second sidelink message on the second component carrier during the first transmission time interval based on a first feedback channel configuration of the first component carrier differing from a second feedback channel configuration of the second component carrier, and the first and second feedback channel configurations each indicating that the first transmission time interval may have a same number of data symbols.

Some examples of the method, apparatuses, and non-transitory computer-readable medium described herein may further include operations, features, means, or instructions for transmitting the first sidelink message on the first component carrier during a first transmission time interval and a third sidelink message on a third component carrier during the first transmission time interval based on a first feedback channel configuration of the first component carrier indicating that the first transmission time interval may have a different number of data symbols than a second feedback channel configuration of the second component carrier and a same number of data symbols as a third feedback channel configuration of the third component carrier.

Some examples of the method, apparatuses, and non-transitory computer-readable medium described herein may further include operations, features, means, or instructions for transmitting the first sidelink message on the first component carrier during a first transmission time interval and the second sidelink message on the second component carrier during a second transmission time interval based on a resource selection rule indicating to exclude a transmission resource during the first transmission time interval on the second component carrier that may have a feedback channel when the first transmission time interval on the first component carrier does not include a feedback channel.

Some examples of the method, apparatuses, and non-transitory computer-readable medium described herein may further include operations, features, means, or instructions for receiving a control message indicating the resource selection rule.

In some examples of the method, apparatuses, and non-transitory computer-readable medium described herein, the resource selection rule may be based on a priority of the first sidelink message relative to a priority of the second sidelink message.

In some examples of the method, apparatuses, and non-transitory computer-readable medium described herein, the resource selection rule may be based on a priority of the first sidelink message relative to a priority of a feedback message to be received via the feedback channel of the second component carrier.

In some examples of the method, apparatuses, and non-transitory computer-readable medium described herein, the resource selection rule may be based on a first channel busyness ratio of the first component carrier and a second channel busyness ratio of the second component carrier.

In some examples of the method, apparatuses, and non-transitory computer-readable medium described herein, the resource selection rule may be based on a resource exclusion pattern.

In some examples of the method, apparatuses, and non-transitory computer-readable medium described herein, each feedback channel configuration indicates periodicity of a feedback channel on a respective component carrier of the set of multiple component carriers.

Some examples of the method, apparatuses, and non-transitory computer-readable medium described herein may further include operations, features, means, or instructions for transmitting, from a medium access control layer to a physical layer, an indication of a sensing resource pool of the sidelink channel and of one or more transmission resource exclusions for the sensing resource pool, receiving, at the medium access control layer and from the physical layer, an indication of a first available resource on the first component carrier and a second available resource on the second component carrier based on the indication of the sensing resource pool and of the one or more transmission resource exclusions, and scheduling transmission of the first sidelink message on the first component carrier and transmission of the second sidelink message on the second component carrier based on the first available resource and the second available resource.

Some examples of the method, apparatuses, and non-transitory computer-readable medium described herein may further include operations, features, means, or instructions for receiving, at a medium access control layer and from a physical layer, an indication of a first available resource on the first component carrier and a second available resource on the second component carrier and scheduling transmission of the first sidelink message on the first component carrier and transmission of the second sidelink message on the second component carrier based on excluding, at the medium access control layer, one or more transmission resources of the first available resource of the first component carrier, of the second available resource of the second component carrier, or both.

Some examples of the method, apparatuses, and non-transitory computer-readable medium described herein may further include operations, features, means, or instructions for receiving the control signaling indicating the feedback channel alignment rule.

Some examples of the method, apparatuses, and non-transitory computer-readable medium described herein may further include operations, features, means, or instructions for monitoring a first feedback channel of the first component carrier for feedback for the first sidelink message, a second feedback channel of the second component carrier for feedback for the second sidelink message, or both.

DETAILED DESCRIPTION

Figure 1:
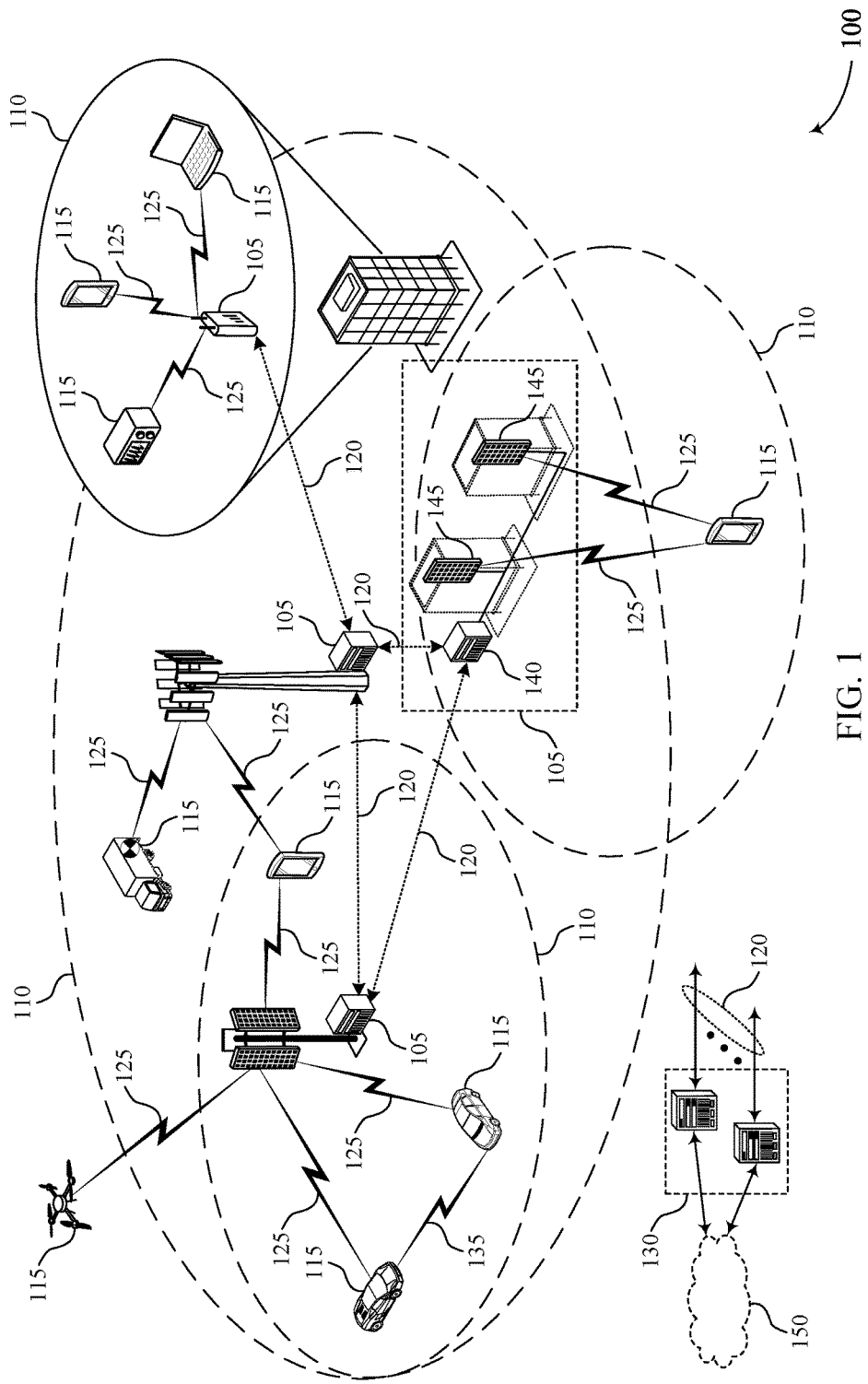
FIG. 1 illustrates an example of a wireless communications system that may support resource selection methods for unaligned feedback transmissions for sidelink carrier aggregation in accordance with aspects of the present disclosure.

In some new radio (NR) systems, carrier aggregation (CA) may be employed in which multiple carriers may be used concurrently to improve capacity of a system. Similar CA techniques may be used in sidelink communications for high bandwidth use cases (e.g., V2X and sensor sharing, such as data sharing for camera, radar, light detection and ranging (LIDAR), or other sensor sharing). In some NR systems, feedback channels may also be used to provide feedback, and such feedback channels may be configured on a per carrier basis. However, if the locations feedback channels (e.g., physical sidelink feedback channel (PSFCH) feedback) are configured differently on different carriers, misalignment in transmissions may occur due to the dissimilar configurations. In cases of feedback channel misalignment, a user equipment (UE) may shorten a first transmission on a first carrier that does not have the configured feedback channel in a slot to be the same duration as a second transmission on a second carrier that does have a feedback channel in that same slot, to make a power profile uniform across the two carriers. This shortening of the first transmission wastes resources on the first carrier as one or more symbol periods on the first carrier go unused that correspond to the symbol periods for the configured feedback channel on the second carrier.

To lessen or eliminate such inefficiencies or waste, a UE may select a subset of the multiple carriers of a sidelink channel to use for transmission that have the same or similar feedback channel configuration. In some examples, a UE may choose a subset of carriers that have each have a same feedback channel configuration (e.g., a PSFCH configuration) to avoid slots having mismatching feedback channels. In other words, the feedback channels on each of the selected carriers are time-aligned and have a same periodicity. Because of the same feedback channel configurations, the UE may simultaneously transmit on both carriers without wasting transmission resources.

In some examples, a UE may choose a subset of carriers that have similar, but not the same, feedback channel configuration. For example, the carriers may have feedback channel periodicities that are multiples of one another. In an example, a first component carrier may have a feedback channel every 2nd slot and a second component carrier may have a feedback channel every 4th slot, where every 4th slot the feedback channels are time-aligned. In some cases, the UE may exclude transmission on resources on one or multiple carriers for slots in which the feedback channel mismatch occurs and may simultaneously transmit during the other slots of the selected carriers without the mismatch. In some examples, the UE may exclude resources based on a priority of data to be transmitted, a priority of feedback data to be received, a carrier busyness ratio of one or more carriers, or a combination thereof. In this way, the UE may reduce or avoid wasting transmission resources on one of the carriers due to dissimilar feedback channel configurations.

Aspects of the disclosure are initially described in the context of wireless communications systems. Aspects of the disclosure are then illustrated by an exemplary system diagram, exemplary resource selection schemes, and exemplary process flows. Aspects of the disclosure are further illustrated by and described with reference to apparatus diagrams, system diagrams, and flowcharts that relate to resource selection methods for unaligned feedback transmissions for sidelink carrier aggregation.

FIG. 1 illustrates an example of a wireless communications system 100. The wireless communications system 100 may include one or more base stations 105, one or more UEs 115, and a core network 130. In some examples, the wireless communications system 100 may be a Long-Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally, or alternatively, an antenna panel may support radio frequency beamforming for a signal transmitted via an antenna port.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

In some examples, a UE 115 may employ CA to improve performance of a wireless system and may employ CA in the context of sidelink communications. In some examples, the UE 115 may receive feedback in the course of sidelink communications. In some examples, the feedback across multiple carriers may be misaligned, which may waste resources, since, in some examples, the UE 115 may maintain a uniform power profile across multiple carriers. To reduce or eliminate such waste, the UE 115 may select a subset of multiple carriers of a sidelink channel for transmission of one or more sidelink messages across the multiple carriers. The UE 115 may select a subset of available carriers based on similar feedback channel configurations of the subset of available carriers. By selecting carriers that may have similar feedback channel configurations, wasted resources that could coincide with the reception of feedback are reduced or eliminated. In some examples, the UE 115 may select a subset of carriers that may have mismatching feedback channel configurations. In some such examples, the UE 115 may exclude one or more resources in one or more slots where a feedback channel configuration misalignment may occur. In this way, the UE 115 may reduce or eliminate wasted resources that would otherwise be selected for transmission but could not be used due to the maintenance of a uniform power profile or for other reasons.

Figure 2:
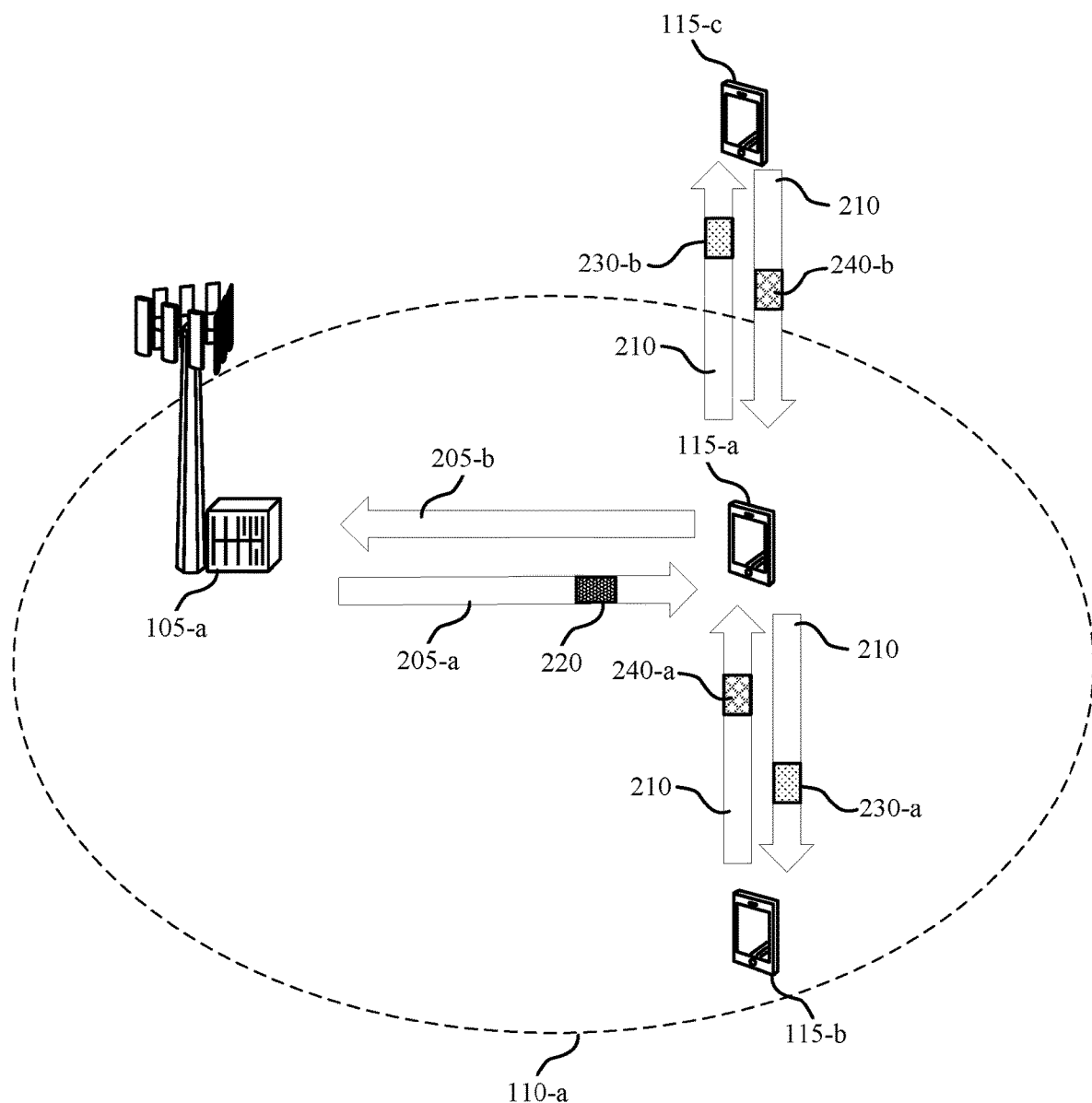
FIG. 2 illustrates an example of a system diagram for a wireless system in accordance with aspects of the present disclosure.

FIG. 2 illustrates an example of a system diagram for a wireless system 200. The wireless communications system 200 may include a base station 105-a that may be an example of the base station 105 discussed in relation to FIG. 1. The wireless communications system 200 may include UE 115-a and UE 115-b that may be examples of the UEs 115 discussed in relation to FIG. 1. In some examples, the base station 105-a and the UE 115 a may be located in a geographic coverage area 110-a. The base station 105-a may communicate with the UE 115-a via one or more downlink communication links 205-a and one or more uplink communication links 205-b. In some examples, the UE 115-b may be located outside of the geographic coverage area 110-a, while in other examples, the UE 115-b may be located inside of the geographic coverage area 110-a. In some examples, UE 115-a may communicate with UE 115-b via one or more sidelink communication links 210. In some examples, the UE 115-a may be within the geographic coverage area 110-a of the base station 105-a while communicating with the UE 115-b (e.g., sidelink mode 1), and in other examples, the UE 115-a may be outside of the geographic coverage area 110-a of the base station 105-a while communicating with the UE 115-b (e.g., sidelink mode 2). Similarly, the UE 115-a may communicate with UE 115-c in much the same way.

In some examples, the UE 115-a may employ CA, in which multiple carriers may be employed concurrently to improve capacity, performance, or other aspects of the wireless system 200. In some examples, the UE 115-a may employ CA in sidelink communications (e.g., sidelink communications with UE 115-b). Such use of CA in sidelink communications may be used to enable high-bandwidth communications in V2X use cases (e.g., sensor sharing such as data sharing for camera, radar, LIDAR, or other cases)

In some examples, CA may be used in sidelink communications, including LTE sidelink communications. In some such examples involving LTE sidelink communications, multiple carriers may be active concurrently. In some such examples, such use may be based on one or more applications being used. In some examples, CA may be used in the context of NR sidelink communications. In some examples of NR communications (including NR sidelink communications), multiple carriers may be used to support one or more applications. In addition, in some example of NR communications (including NR sidelink communications) feedback channels may be used, and one or more of the feedback channels may be configured on a per-carrier basis.

In some examples, the use of CA may include the use of multiple carriers that may be active concurrently. In some examples, such use of concurrent active carriers may be based on one or more applications used in the sidelink communications. In some examples involving CA, the UE 115-a or another wireless device may perform carrier to application mapping. Such carrier to application mapping may be performed on one or more layers of a protocol stack (e.g., higher layers of the protocol stack).

In some cases (e.g., a sensor sharing case), it may be desirable to employ multiple carriers to support an application. In some examples, one or more feedback channels (e.g., a physical sidelink feedback channel (PSFCH)) may be supported for communications (e.g., sidelink communications). In some examples, these feedback channels may be configured on a per-carrier basis. In some examples, if multiple feedback channel configurations are configured differently for different carriers, there is a possibility that misalignment in transmissions could occur due to the dissimilar feedback channel configurations.

In some such examples involving dissimilar feedback channel configurations, the UE 115-a may shorten or otherwise modify one or more transmissions to maintain a uniform power profile across carriers. For example, if, in a given slot or resource, a first carrier is not configured for feedback and a second carrier is configured for feedback, the UE may shorten or otherwise modify a transmission or transmission configuration of the first carrier to maintain a uniform power profile across the two carriers. As such, transmission time for the first carrier may be reduced, possibly leading to wasted resources.

In some examples, the UE 115-a may receive control signaling 220 from the base station 105-a. In some examples, the UE 115-a may receive the control signaling 220 from another source (e.g., the UE 115-b, the UE 115-c, or another device may transmit control signaling associated with sidelink communications). The control signaling 220 may indicate one or more component carriers associated with a sidelink channel. The control signaling 220 may indicate one or more feedback channel configurations (e.g., for transmission of the feedback message 240) for the one or more component carriers associated with the sidelink channel.

In some examples, the UE 115-a may select a subset of the one or more component carriers for transmission of a first sidelink message 230-a (e.g., to UE 115-b and a second sidelink message 230-b (e.g., to UE 115-c). In some examples, such a selection may be based on the one or more feedback channel configurations received in the control signaling 220. In some examples, such a selection may be performed using a feedback channel alignment rule. The feedback channel alignment rule may indicate to select one or more component carriers that may have feedback channels aligned in time. For example, the one or more component carriers may both have a feedback channel in the same slot or time resource for transmitting one or more feedback messages (e.g., the first feedback message 240-a, the second feedback message 240-b, or both).

In some examples, the UE 115-a may transmit the first sidelink message 230-a on a first selected component carrier (e.g., to UE 115-b), and the UE 115-a may transmit the second sidelink message 230-b on a second selected component carrier (e.g., to UE 115-c). The first and second selected component carriers may be part of the selected subset of component carriers. In this way, wasted resources may be reduced or eliminated, and a uniform power profile may be maintained.

Figure 3:
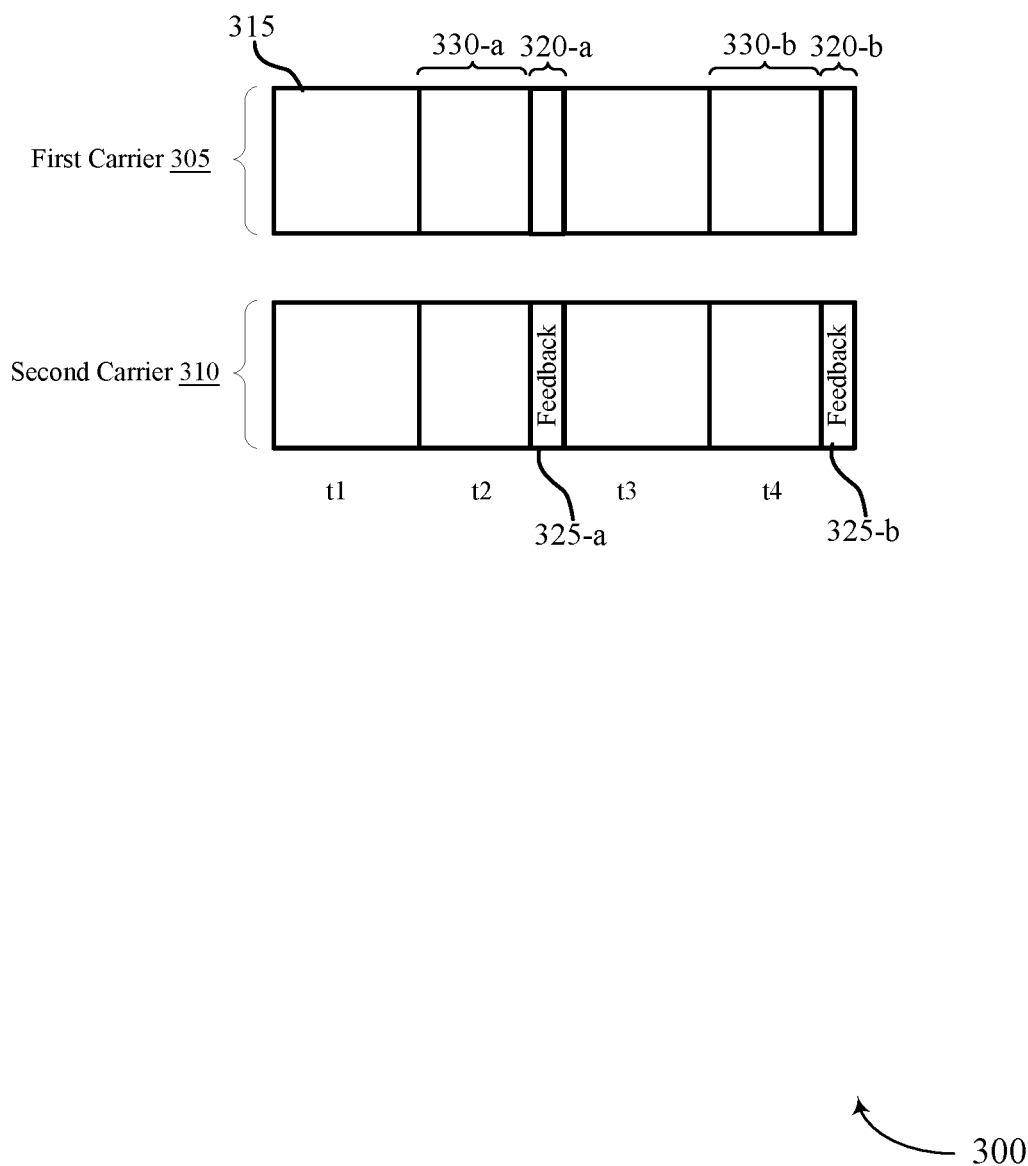
FIG. 3 illustrates an example of a resource selection scheme in accordance with aspects of the present disclosure.

FIG. 3 illustrates an example of a resource selection scheme 300. The resource selection scheme 300 may include or involve a first carrier 305 and a second carrier 310. In some embodiments, a UE (e.g., UE 115-a discussed in relation to FIG. 2) may transmit, across both the first carrier 305 and the second carrier 310. In the example depicted in FIG. 3, the first carrier 305 may not be configured with a feedback resource (e.g., during time periods 320-a and 320-b in time slots t2 and t4, respectively). However, the second carrier 310 may be configured with one or more feedback resources (e.g., the UE may be configured to receive feedback over one or more PSFCHs, such as feedback channels 325-a and 325-b in time slots t2 and t3, respectively). In some examples, the UE (e.g., UE 115-a) may be transmitting to another UE (e.g., UE 115-c discussed in relation to FIG. 2) over the first carrier 305. The UE (e.g., UE 115-a) may also be transmitting to yet another UE (e.g., UE 115-d discussed in relation to FIG. 2) over the second carrier 310.

In the course of operation, the UE 115-a may transmit to UE 115-c on the first carrier 305 and transmit to UE 115-d on the second carrier 310. In some such cases, the UE 115-a may enter a receive mode during the feedback channel 325-a on the second carrier 310 after transmitting on the second carrier 310 during time period 330-a. For example, the UE 115-a may enter a receive mode during time period 320-a, time period 320-b, or both, to receive one or more feedback messages via a feedback channel (e.g., feedback messages 240 discussed in relation to FIG. 2) after transmitting on the first carrier 305, the second carrier 310, or both, during time period 330-a. As a result, the UE 115-a may shorten one or more transmissions corresponding to the same time period or periods in which the one or more feedback messages may be received. For example, the UE 115-a may shorten one or more transmissions transmitted over the first carrier 305. In one example, as shown in FIG. 3, the feedback channel 325-a may be scheduled over the second carrier 310 in time slot t2, and the feedback channel 325-b may be scheduled over the second carrier 310 in time slot t4. As a result, one or more transmissions made over the first carrier 305 in time slot t2 or time slot t4 may be shortened (e.g., instead of transmitting or receiving over the full time slot t2 or t4, the UE 115-a may transmit over time period 330-a or time period 330-b, thereby excluding transmission dur time period 320-a or time period 320-b which may have been used for transmitting or receiving one or more feedback transmissions) which may result in wasted resources on the first carrier 305 during time period 320-a or time period 320-b. In addition, the UE 115-a may transmit an indication of the shortened transmission time to the intended receiver of the one or more transmissions made over the first carrier 305.

In some examples involving groupcast or broadcast, in which various wireless devices may communicate over varying channel conditions, such a shortened transmission may cause varying degrees of detrimental effects, some of which may be lessened by the UE 115-a notifying the receivers of the shortened transmission (e.g., via sidelink control information (SCI)). However, such detrimental effects may still occur, and resources may still be wasted.

Figure 4:
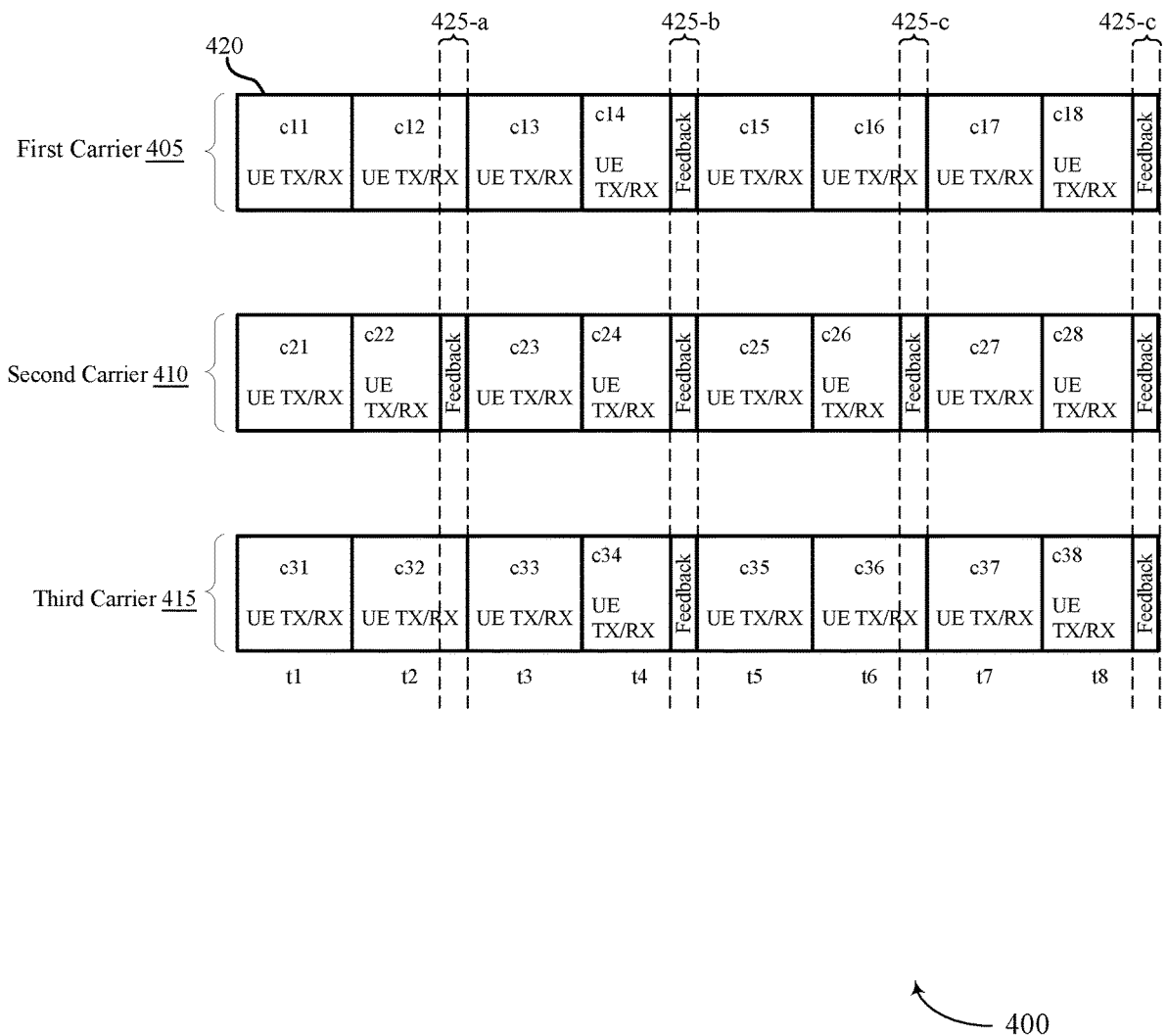
FIG. 4 illustrates an example of a resource selection scheme in accordance with aspects of the present disclosure.

FIG. 4 illustrates an example of a resource selection scheme 400. The resource selection scheme 400 may include or involve a first carrier 405, a second carrier 410, and a third carrier 415. The resource selection scheme 400 may include or involve a number of time slots t1 through t8. For purposes of this exemplary discussion, each carrier may be divided into a number of resources 420 delineated by the time slots t1 through t8. For example, the fourth resource corresponding to time slot t4 on the second carrier 410 may be referred to as resource c24, in which the "2" may refer to the carrier number (e.g., "2" for the second carrier 410), and the '4" may refer to the time slot (e.g., time slot t4).

In one example, a UE (e.g., the UE 115-a as discussed in reference to FIG. 2, which may be used as an example UE for the discussion of FIG. 4) may select a subset of carrier from a set of available carriers. The selected carriers in the subset may include similar feedback channel configurations (e.g., a PSFCH configuration). Alternatively, or additionally, the selected carriers in the subset may include a same or similar number of symbols (e.g., OFDM symbols) available for data transmission. For example, and as shown in FIG. 4, a feedback channel configuration of the first carrier 405 indicates a feedback channel periodicity of four slots, a feedback channel configuration of the second carrier 410 indicates a feedback channel periodicity of two slots, and a feedback channel configuration of the third carrier 415 indicates a feedback channel periodicity of four slots. In such an example, the UE 115-a may select the first carrier 405 and the third carrier 415 for transmission, reception, or both. Such a selection may be based on the similar configurations of the first carrier 405 and the third carrier 415. For example, since both the first carrier 405 and the third carrier 415 may a same feedback channel periodicity of every fourth slot (e.g., during time period 425-b and time period 425-d), the UE 115-a may determine that the first carrier 405 and the third carrier 415 include similar feedback channel configurations.

In some examples, the UE 115-a may select a subset of available carriers based on a feedback channel alignment rule. Such a feedback channel alignment rule may indicate to select a subset of component carriers, and may indicate to select a subset of component carriers that may have one or more feedback channels aligned in time (e.g., feedback channels aligned in time for at least a subset of a plurality of transmission time intervals). For example, a feedback channel alignment rule may indicate to select the first carrier 405 and the third carrier 415, since the feedback channels of the first carrier 405 and the third carrier 415 align in time (e.g., having the same feedback channel periodicity that occurs during time period 425-b and 425-d). The feedback channel alignment rule may not indicate to select the second carrier 410, since the feedback channels of the first carrier 405 and the second carrier 410 do not align in time during time period 425-a and time period 425-c (e.g., have different feedback channel periodicities). The feedback channel alignment rule may take into account other conditions, factors, properties, or elements associated with the carriers, feedback channels, or other aspects of the present subject matter.

In some examples, the UE 115-a may apply the feedback channel alignment rule that indicates to select a subset of available carriers that have similar feedback channel configurations. In some examples, the UE 115-a may select a subset of multiple carriers of a sidelink channel for transmission of one or more sidelink messages across the multiple carriers. For example, the UE 115-a may select the first carrier 405 for transmission, and the UE 115-a may not select the second carrier 410, given that the feedback channels of the first and third carriers do not occur at the same periodicity. Rather, in some examples, the UE 115-a may select a third carrier (e.g., third carrier 415) that may be more compatible with the first carrier 405 (e.g., the third carrier 415 may be associated with a feedback channel configuration that may better align with a feedback channel configuration of the first carrier 305, such as having the same periodicity). By selecting carriers that may have similar feedback channel configurations, wasted resources that could coincide with the reception of feedback are reduced or eliminated.

In some examples, the UE 115-a may apply the feedback channel alignment rule that indicates to select a subset of carriers that may have similar, but mismatching feedback channel configurations. In some such examples, the UE 115-a may exclude one or more resources in one or more slots where a feedback channel configuration misalignment may occur. For example, the UE 115-a may exclude transmission resources of the first carrier 305 in time slot t2 and time slot t4, since a feedback channel configuration misalignment may occur in these timeslots. In this way, the UE 115-a may reduce or eliminate wasted resources that would otherwise be selected for transmission but could not be used due to the maintenance of a uniform power profile or for other reasons.

However, in some examples, carriers with similar feedback channel configurations may not be available, or the UE 115-a may choose carriers with similar, but mismatching, feedback channel configurations, but may exclude transmission on resources during a time period where carriers have mismatching feedback channels. For example, the first carrier 405 and the second carrier 410 may include different feedback channel configurations. In some such examples, the UE 115-a may exclude resources that may include a different number of symbols (e.g., OFDM symbols) for data transmissions during one or more time periods (e.g., time period 425-a and time period 425-c) due to one carrier having a feedback channel during a time slot whereas the other carrier does not have a feedback channel in that time slot. For example, and as shown in FIG. 4, the resource c12 of the first carrier 405 and the resource c22 of the second carrier 410 may include different numbers of symbols (e.g., OFDM symbols) due to the presence of the feedback channel in c22 of the second carrier 410 during time period 425-a whereas the first carrier 405 does not have resource allocated for a feedback channel during time period 425-a. A similar situation may also be seen during time period 425-c and with the c16 resource and the c26 resource.

In some examples, the UE 115-a may apply a resource selection rule to select or exclude one or more resources for consideration for data transmission scheduling, data reception scheduling, or both based on a number of data symbols in one or more resources (e.g., a same number of data symbols or a different number of data symbols), that, in some cases, may be indicated in a feedback channel configuration. For example, if the c13 resource of the first carrier 405 and the c23 resource of the second carrier 410 are candidates for resource selection, the UE 115-a may select the c13 resource and the c23 resource if they each have a same number of data symbols. However, in another example in which the UE 115-a may be considering the c12 resource of the first carrier 405 and the c22 resource of the second carrier 410, the UE 115-a may determine or detect that the c12 resource may have a different number of data symbols that the c22 resource (e.g., due to the presence of the feedback channel in the c22 resource during time period 425-a). In some such examples, the UE 115-a may determine, select, or identify a third resource such as the c32 resource of the third carrier 415, since the c22 resource of the second carrier 410 has a different number of symbols than the c12 resource of the first carrier 405, but the c32 resource of the third carrier 415 may have a same number of data symbols as the c12 resource of the first carrier 405. In this way, the UE 115-a may make more efficient use of transmission or reception resources, since a uniform power profile may be maintained (e.g., due to the same number of data symbols in the c12 resource and the c32 resource).

In some such examples, the UE 115-a may, when operating using carrier aggregation, apply the resource selection rule to exclude one or more resources for consideration for data transmission scheduling, data reception scheduling, or both. For example, the UE 115-a may transmit or receive on multiple carriers, and may apply the resource selection rule to select one or more slots (e.g., one or more of time slots t1 through t8) on multiple carriers that may, for example, both have a feedback channel or neither have a feedback channel. In some examples, the UE 115-a may not select one or more slots where one carrier may have a feedback channel and another carrier may not have a feedback channel in accordance with the resource selection rule. In one example described with reference to FIG. 4, the UE 115-*a* may exclude the c22 resource from consideration for data transmission scheduling, data reception scheduling, or both. In some examples, the UE 115-*a* may instead exclude the c12 resource from consideration. Similarly, the UE 115-*a* may exclude the c16 resource or may exclude the c26 resource. For example, if the UE 115-*a* selects the resource c22 and the resource c26 for exclusion from scheduling consideration, the resources available for transmission may then include the resources c11, c12, c13, c14, c15, c16, c17, and c18 on the first carrier 405, and may further include the resources c21, c23, c24, c25, c27, and c28 on the second carrier 410. The UE 115-*a* may make various combinations of exclusions. For example, the UE 115-*a* may exclude the resource c22 and the resource c16. In other examples, the UE 115-*a* may exclude the resources c12 and c16. In yet further examples, the UE 115-*a* may exclude the resources c12 and c26.

In some examples, the UE 115-*a* may exclude one or more resources from consideration for resource scheduling based on a resource selection rule. For example, a resource selection rule may indicate to exclude certain resources based on one or more criteria or factors. Such criteria or factors may include equitable distribution of exclusions across carriers, channel conditions associated with one or more of the carriers, error rates associated with one or more of the carriers, priorities of data to be transmitted, one or more priority thresholds, one or more channel busyness ratios, resource exclusion patterns, or other criteria or factors as may be described herein.

For example, in one case, the selection of resources to be excluded under the resource selection rule may depend on or be based on a priority of data to be transmitted or received in each carrier. If, for example, at time slot t2, the priority of data to be transmitted over the first carrier 405 is greater than a priority of data to be transmitted over the second carrier 410, then the UE 115-*a* may apply the resource selection rule to exclude the lower priority carrier resource in its transmission (e.g., the resource c22). The UE 115-*a* may then apply the resource selection rule to schedule and transmit the data having the higher priority over the first carrier 405 in slot t2, and may not schedule and transmit data over the second carrier 410 in slot t2. In a further example, the UE 115-*a* may apply the resource selection rule to compare a priority of data to be transmitted with a priority of one or more feedback messages to determine a selection of one or more resources to be excluded from scheduling consideration. For example, if at time slot t6, the priority of data to be transmitted over the first carrier 405 on resource c16 is less than a minimum of the priority of feedback messages that are to be received over the second carrier 410 on resource c26 (e.g., during time period 425-*c*), then the UE may exclude resource c16 by refraining from scheduling and transmitting data over the first carrier 405 during time slot t6. Additionally or alternatively, the UE 115-*a* may schedule and transmit data (e.g., including feedback to be transmitted over the feedback channel during time period 325-*c*) over the second carrier 410 during time slot t6.

In addition, in some examples, the UE 115-*a* may compare a priority of data to be transmitted with a threshold priority value or indication to determine selection of one or more resources to be excluded from scheduling consideration, and a resource selection rule may be based on such a priority of data, a threshold priority value, or a combination thereof. For example, if at time slot t6, the priority of data to be transmitted over the first carrier 405 on resource c16 is less than a threshold priority value or indication, the UE 115-*a* may exclude resource c16. As such, the UE 115-*a* may refrain from scheduling and transmitting data over the first carrier 405 during time slot t6.

In some examples, the UE 115-*a* may select one or more resources to be excluded from scheduling consideration based on a relative or absolute channel busyness ratio (CBR) of each carrier. For example, a resource selection rule may be based on one CBRs of one or more carriers. For example, if the CBR of the first carrier 405 is less than the CBR of the second carrier 410 (e.g., during a time period such as the last T seconds), then, during one or more time periods in which misalignment may occur (e.g., time period 425-*a* in time slot t2 or time period 425-*c* in time slot t6, for example) the UE 115-*a* may apply the resource selection rule to exclude resources in the first carrier 405 (e.g., the resource c12, the resource c16, or both). As such, the UE 115-*a* may refrain from scheduling and transmitting data over the first carrier 415 during time slot t2, time slot t6, or both. Further, the UE 115-*a* may schedule and transmit data over the second carrier 415 during time slot t2, time slot t6, or both.

In some cases, the UE 115-*a* may apply the resource selection rule to select one or more resources to be excluded from scheduling consideration based on a pattern (e.g., a preconfigured pattern or a pattern received through control signaling, such as RRC signaling or DCI). For example, a resource selection rule may be based on one or more such patterns (e.g., a resource exclusion pattern). For example, in time slots where there may be a dissimilarity in feedback channel configurations or a number of symbols (e.g., time period 425-*a* in time slot t2, time period 425-*c* in time slot t6, or both) between the first carrier 405 and the second carrier 410, the UE 115-*a* may apply the resource selection rule to exclude resources in the first carrier 405 in time slots that may satisfy a first pattern or equation (e.g., slot number % N==k1), and the UE 115-*a* may exclude one or more resources in the second carrier 410 in time slots that may satisfy a second pattern or equation (e.g., slot number % N==k2). As such, the UE 115-*a* may refrain from scheduling and transmitting data in the excluded resources of the first carrier 405 during one or more time slots that satisfy the first pattern or equation and may refrain from scheduling and transmitting data in the excluded resources of the second carrier 410 during one or more time slots that satisfy the second pattern. Additionally or alternatively, the UE 115-*a* may schedule and transmit data in resources of the first carrier 405 during one or more time slots that do not satisfy the first pattern, resources of the second carrier 405 during one or more time slots that do not satisfy the second pattern, additional resources associated with another carrier, or a combination thereof.

In some cases, the UE 115-*a* may exclude one or more resources in one or more times slots on one or more carriers, which may constrain the possibilities for transmission, reception, or both, in certain time slots (e.g., time slot t2 or time slot t6). In some such cases, the UE 115-*a* may compensate for such constraints by selecting another carrier (e.g., the third carrier 415) for further resource scheduling options. For example, if the UE 115-*a* applies the resource selection rule to exclude a resource in time slot t2 and in time slot t6 due to feedback channel mismatch between the first carrier 405 and the second carrier 410, the UE 115-*a* may apply the resource selection rule to select additional resources for scheduling consideration from the third carrier 415 (e.g., resource c32 in time slot t2 or resource c36 in time slot t6). In this example, the UE 115-*a* may then select resources c12 and c16 on the first carrier 405 and resources c32 and c36 on the third carrier 415 for data transmission in time slot t2 while transmitting over the first carrier 405 and the second carrier 410 in one or more other time slots (e.g., in time slots t1, t3, t4, t5, t7, and t8) in which the feedback channel mismatch between the first carrier 405 and the second carrier 410 does not occur.

Figure 5A:
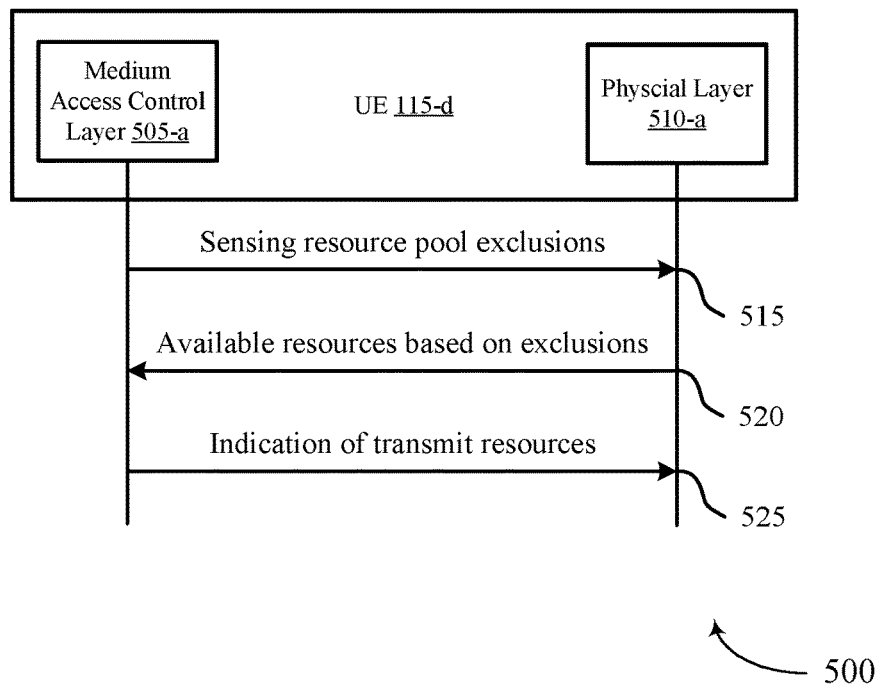
FIGS. 5A and 5B illustrates examples of process flows in accordance with aspects of the present disclosure.
Figure 5B:
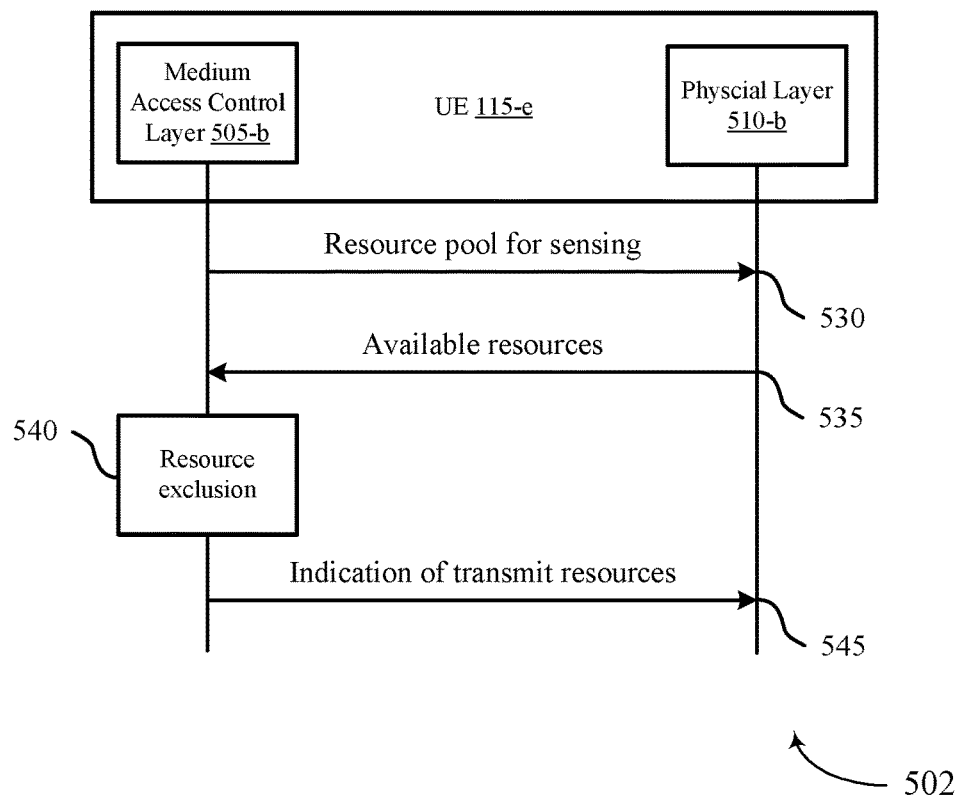

FIGS. 5A and 5B illustrates examples of process flows (e.g., process flows 500 and 502) that may relate to protocol stack or layer coordination. Process flows 500 and 502 may implement signaling (e.g., higher layer signaling) for resource exclusion. For example, in sidelink mode 2, a higher layer may request the UE to determine a subset of resources from which the higher layer will select resources for physical sidelink control channel (PSCCH) or physical sidelink shared channel (PSSCH) transmission, reception, or both.

In one example shown in process flow 500, at 515 the UE 115-a at the medium access control (MAC) layer 505-a may transmit (e.g., to the physical layer 510-a) one or more sensing resource pool exclusions. This transmission may be in addition to a resource pool from which resources are to be reported (e.g., L1 priority, etc.). In some examples, the resource pool may include resources on multiple carriers. For example, and in reference to FIG. 4, a potential resource pool may include resources c11-c18 of the first carrier 405, resources c21-c28 of the second carrier 410, and resources c31-c38 of the third carrier 415. For example, the resource pool exclusions may include one or more resources that the UE 115-d has excluded from a carrier in a time slot (e.g., one or more individual resources or periodic resources such as a time slot t1, t1+Δ, t1+2Δ etc.). For example, if the UE 115-d excludes resource c22 in time slot t2 shown in FIG. 4 from scheduling consideration, the MAC layer 505-a may include such a resource exclusion in the sensing resource pool exclusion(s) transmitted at 515. For example, and with reference to FIG. 4, the resource pool may then include resources c11-c18 of the first carrier 405, resources c21 and c23-c28 of the second carrier 410, and resources c31-c38 of the third carrier 415, but may not include resource c21 of the second carrier 410.

At 520, the UE 115-d at the physical layer 510-a may identify and transmit (e.g., to the MAC layer) one or more indications of available resources in accordance with the one or more resource pool exclusions indicated by the MAC layer 505-a. For example, the UE 115-d may perform sensing on one or more resources of a resource pool at the physical layer 510-a, taking into account the sensing resource pool exclusions indicated by the MAC layer 505-a. The UE 115-d may determine or select one or more available resources of the resource pool (e.g., the UE 115-d may sense whether detected energy in a one or more non-excluded resources of the resource pool satisfies a threshold, determine whether SCI is received in those non-excluded resources, or a combination thereof).

At 525, the UE 115-d at the MAC layer 505-a may transmit (e.g., to the physical layer 510-a) one or more indications of available transmit resources of the resource pool, which may be a subset or all of the one or more indications of available resources. For example, the UE 115-d may schedule one or more resources and may transmit or receive over the one or more scheduled resources. These one or more resources may be some or all of the resources of the resource pool that were indicated by the MAC layer 505-a. For example, if the UE 115-d has identified, through the approaches described herein (e.g., the approach described in relation to FIG. 5A) a first available resource on the first carrier and a second available resource on the second carrier, the UE 115-d may schedule the first available resource on the first carrier for transmission of a first sidelink message, and the UE 115-e may schedule the second available resource on the second carrier for transmission of a second sidelink message accordingly.

In one example shown in process flow 502, at 530 the UE 115-d at the MAC layer 505-b may transmit (e.g., to the physical layer 510-b) one or more indications of a resource pool to be used for sensing (e.g., a resource pool from which resources are to be reported, L1 priority etc.). In some examples, the resource pool may include resources from multiple carriers. For example, and in reference to FIG. 4, a potential resource pool may include resources c11-c18 of the first carrier 405, resources c21-c28 of the second carrier 410, and resources c31-c38 of the third carrier 415. In some examples, the one or more indications of the resource pool to be used for sensing may not include one or more resource exclusion indications or parameters for the resource pool as discussed with reference to process flow 500.

In some examples, at 535, the UE 115-d at the physical layer 510-b may transmit (e.g., to the MAC layer 505-b) one or more indications of available resources of the resource pool. For example, the UE 115-e may perform sensing at the physical layer 510-a on one or more resources of the resource pool indicated by the MAC layer 505-b. The UE 115-e may determine or select one or more available resources of the pool (e.g., the UE 115-e may sense whether detected energy in a one or more resources satisfies a threshold, determine whether SCI is received in those resources, or a combination thereof). In some examples, such indications of available resources may be transmitted without regard to one or more dissimilarities is feedback channel configurations (e.g., PSFCH configurations) for one or more carriers.

In some examples, at 540, the MAC layer 505-b may perform resource exclusion. In some examples, such resource exclusion may exclude one or more resources that the physical layer 510-b reported as being available. In some examples, the MAC layer 505-b may randomly, pseudo-randomly, or based on one or more factors, select one or more resources from available resources remaining after resource exclusion, and may, at 545, transmit (e.g., to the physical layer 510-b) one or more indications of transmit resources, which may be based on the one or more indications of available resources after resource exclusion is performed. For example, the UE 115-e may schedule one or more resources and may transmit or receive over the one or more scheduled resources. These one or more resources may be some or all of the resources of the resource pool identified by the MAC layer 505-b that are available at the physical layer 510-a. For example, if the UE 115-e has identified, through the approaches described herein (e.g., the approach described in relation to FIG. 5B) a first available resource on the first carrier and a second available resource on the second carrier at the physical layer 510-a as reported to the MAC layer 505-a, the UE 115-e may schedule the first available resource on the first carrier for transmission of a first sidelink message, and the UE 115-e may schedule the second available resource on the second carrier for transmission of a second sidelink message accordingly.

Figure 6:
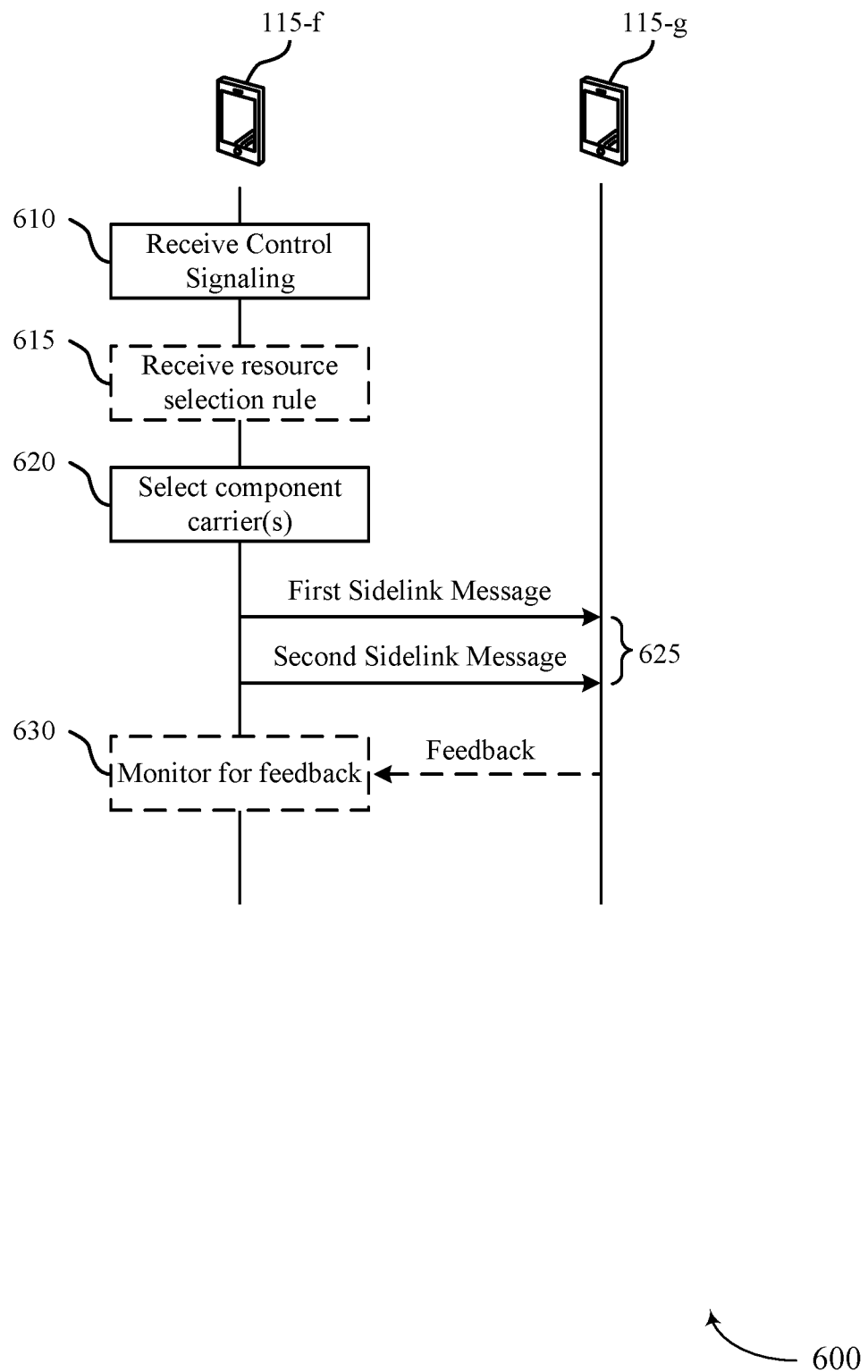
FIG. 6 illustrates an example of a process flow in accordance with aspects of the present disclosure.

FIG. 6 illustrates an example of a process flow 600. The process flow 600 may implement various aspects of the present disclosure described with reference to FIGS. 1-5. The process flow 600 may include a first UE 115-f and a second UE 115-g, which may be examples UEs 115 as described with reference to FIGS. 1-5. In some examples, the first UE 115-f may be configured with a resource selection capability as described herein.

In the following description of the process flow 600, the operations between the first UE 115-f and the second UE 115-g may be performed in different orders or at different times. Some operations may also be left out of the process flow 600, or other operations may be added. Although the first UE 115-f and the second UE 115-g are shown performing the operations of the process flow 600, some aspects of some operations may also be performed by one or more other wireless devices.

At 610, the first UE 115-f may receive control signaling that may indicate a plurality of component carriers of a sidelink channel and a plurality of feedback channel configurations for the plurality of component carriers. In some examples, each feedback channel configuration may indicate periodicity of a feedback channel on a respective component carrier of the plurality of component carriers. In some examples, the UE 115-g may receive the control signaling that may indicate the feedback channel alignment rule.

At 615, the first UE 115-f may receive a control message that may indicate a resource selection rule. In some examples, the resource selection rule may be based on a priority of the first sidelink message relative to a priority of the second sidelink message.

At 620, the first UE 115-f may select, based on the plurality of feedback channel configurations, a subset of the plurality of component carriers for transmission of a first sidelink message and a second sidelink message using a feedback channel alignment rule that may indicate to select component carriers having feedback channels aligned in time for at least a subset of a plurality of transmission time intervals. In some examples, the resource selection rule may be based on a priority of the first sidelink message relative to a priority of a feedback message to be received via the feedback channel of the second component carrier. In some examples, the resource selection rule may be based on a first channel busyness ratio of the first component carrier and a second channel busyness ratio of the second component carrier. In some examples, the resource selection rule may be based on a resource exclusion pattern.

In some examples, the UE 115-f may transmit, from a medium access control layer to a physical layer, an indication of a sensing resource pool of the sidelink channel and of one or more transmission resource exclusions for the sensing resource pool. In some examples, the UE 115-f may receive, at the medium access control layer and from the physical layer, an indication of a first available resource on the first component carrier and a second available resource on the second component carrier based on the indication of the sensing resource pool and of the one or more transmission resource exclusions. In some examples, the UE 115-f may schedule transmission of the first sidelink message on the first component carrier and transmission of the second sidelink message on the second component carrier based on the first available resource and the second available resource.

In some examples, the UE 115-f may receive, at a medium access control layer and from a physical layer, an indication of a first available resource on the first component carrier and a second available resource on the second component carrier. In some examples, the UE 115-f may schedule transmission of the first sidelink message on the first component carrier and transmission of the second sidelink message on the second component carrier based on excluding, at the medium access control layer, one or more transmission resources of the first available resource of the first component carrier, of the second available resource of the second component carrier, or both.

At 625, the first UE 115-f may transmit the first sidelink message on a first component carrier of the subset and the second sidelink message on a second component carrier of the subset. In some examples, the UE 115-f may transmit the first sidelink message on the first component carrier of the subset and the second sidelink message on the second component carrier of the subset based on the feedback channel alignment rule that may indicate to select at least two of the plurality of component carriers that each may have time-aligned feedback channels and a same feedback channel periodicity.

In some examples, the UE 115-f may transmit the first sidelink message on the first component carrier during a first transmission time interval and the second sidelink message on the second component carrier during the first transmission time interval based on a first feedback channel configuration of the first component carrier differing from a second feedback channel configuration of the second component carrier, and the first and second feedback channel configurations may indicate that the first transmission time interval may have a same number of data symbols.

In some examples, the UE 115-f may transmit the first sidelink message on the first component carrier during a first transmission time interval and a third sidelink message on a third component carrier during the first transmission time interval based on a first feedback channel configuration of the first component carrier that may indicate that the first transmission time interval may have a different number of data symbols than a second feedback channel configuration of the second component carrier and a same number of data symbols as a third feedback channel configuration of the third component carrier.

In some examples, the UE 115-f may transmit the first sidelink message on the first component carrier during a first transmission time interval and the second sidelink message on the second component carrier during a second transmission time interval based on a resource selection rule that may indicate to exclude a transmission resource during the first transmission time interval on the second component carrier that may have a feedback channel when the first transmission time interval on the first component carrier does not include a feedback channel.

At 630, the first UE 115-f may monitor a first feedback channel of the first component carrier for feedback for the first sidelink message, a second feedback channel of the second component carrier for feedback for the second sidelink message, or both.

Figure 7:
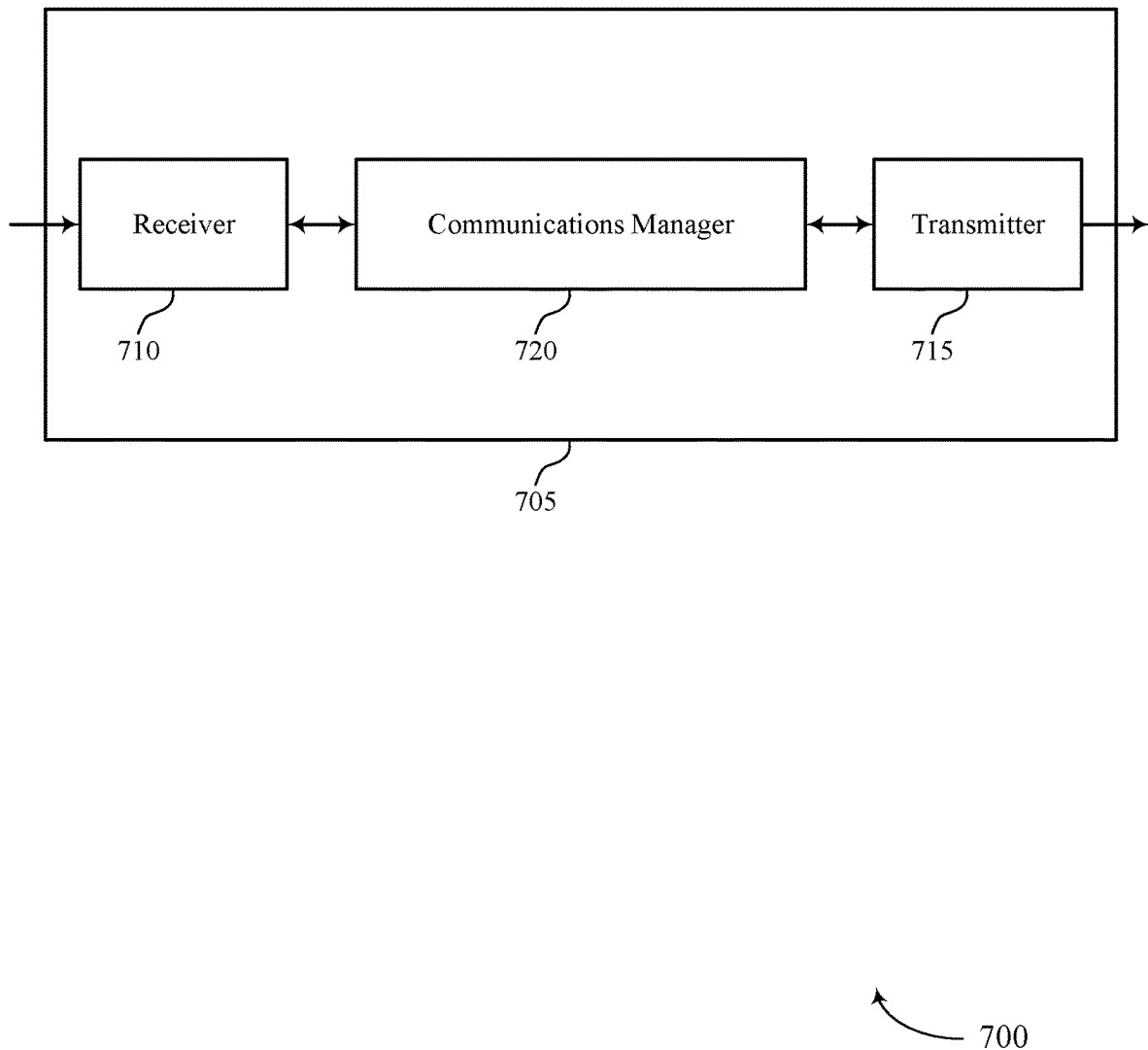
FIGS. 7 and 8 show block diagrams of devices in accordance with aspects of the present disclosure.

FIG. 7 shows a block diagram 700 of a device 705. The device 705 may be an example of aspects of a UE 115 as described herein. The device 705 may include a receiver 710, a transmitter 715, and a communications manager 720. The device 705 may also include a processor. Each of these components may be in communication with one another (e.g., via one or more buses).

The receiver 710 may provide a means for receiving information such as packets, user data, control information, or any combination thereof associated with various information channels (e.g., control channels, data channels, information channels related to resource selection methods for unaligned feedback transmissions for sidelink carrier aggregation). Information may be passed on to other components of the device 705. The receiver 710 may utilize a single antenna or a set of multiple antennas.

The transmitter 715 may provide a means for transmitting signals generated by other components of the device 705.

For example, the transmitter 715 may transmit information such as packets, user data, control information, or any combination thereof associated with various information channels (e.g., control channels, data channels, information channels related to resource selection methods for unaligned feedback transmissions for sidelink carrier aggregation). In some examples, the transmitter 715 may be co-located with a receiver 710 in a transceiver module. The transmitter 715 may utilize a single antenna or a set of multiple antennas.

The communications manager 720, the receiver 710, the transmitter 715, or various combinations thereof or various components thereof may be examples of means for performing various aspects of resource selection methods for unaligned feedback transmissions for sidelink carrier aggregation as described herein. For example, the communications manager 720, the receiver 710, the transmitter 715, or various combinations or components thereof may support a method for performing one or more of the functions described herein.

In some examples, the communications manager 720, the receiver 710, the transmitter 715, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 720, the receiver 710, the transmitter 715, or various combinations or components thereof may be implemented in code (e.g., as communications management software or firmware) executed by a processor. If implemented in code executed by a processor, the functions of the communications manager 720, the receiver 710, the transmitter 715, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 720 may be configured to perform various operations (e.g., receiving, monitoring, transmitting) using or otherwise in cooperation with the receiver 710, the transmitter 715, or both. For example, the communications manager 720 may receive information from the receiver 710, send information to the transmitter 715, or be integrated in combination with the receiver 710, the transmitter 715, or both to receive information, transmit information, or perform various other operations as described herein.

The communications manager 720 may support wireless communication at a user equipment in accordance with examples as disclosed herein. For example, the communications manager 720 may be configured as or otherwise support a means for receiving control signaling indicating a set of multiple component carriers of a sidelink channel and a set of multiple feedback channel configurations for the set of multiple component carriers. The communications manager 720 may be configured as or otherwise support a means for selecting, based on the set of multiple feedback channel configurations, a subset of the set of multiple component carriers for transmission of a first sidelink message and a second sidelink message using a feedback channel alignment rule indicating to select component carriers having feedback channels aligned in time for at least a subset of a set of multiple transmission time intervals. The communications manager 720 may be configured as or otherwise support a means for transmitting the first sidelink message on a first component carrier of the subset and the second sidelink message on a second component carrier of the subset.

By including or configuring the communications manager 720 in accordance with examples as described herein, the device 705 (e.g., a processor controlling or otherwise coupled to the receiver 710, the transmitter 715, the communications manager 720, or a combination thereof) may support techniques for reduced processing, reduced power consumption, more efficient utilization of communication resources, or a combination thereof.

Figure 8:
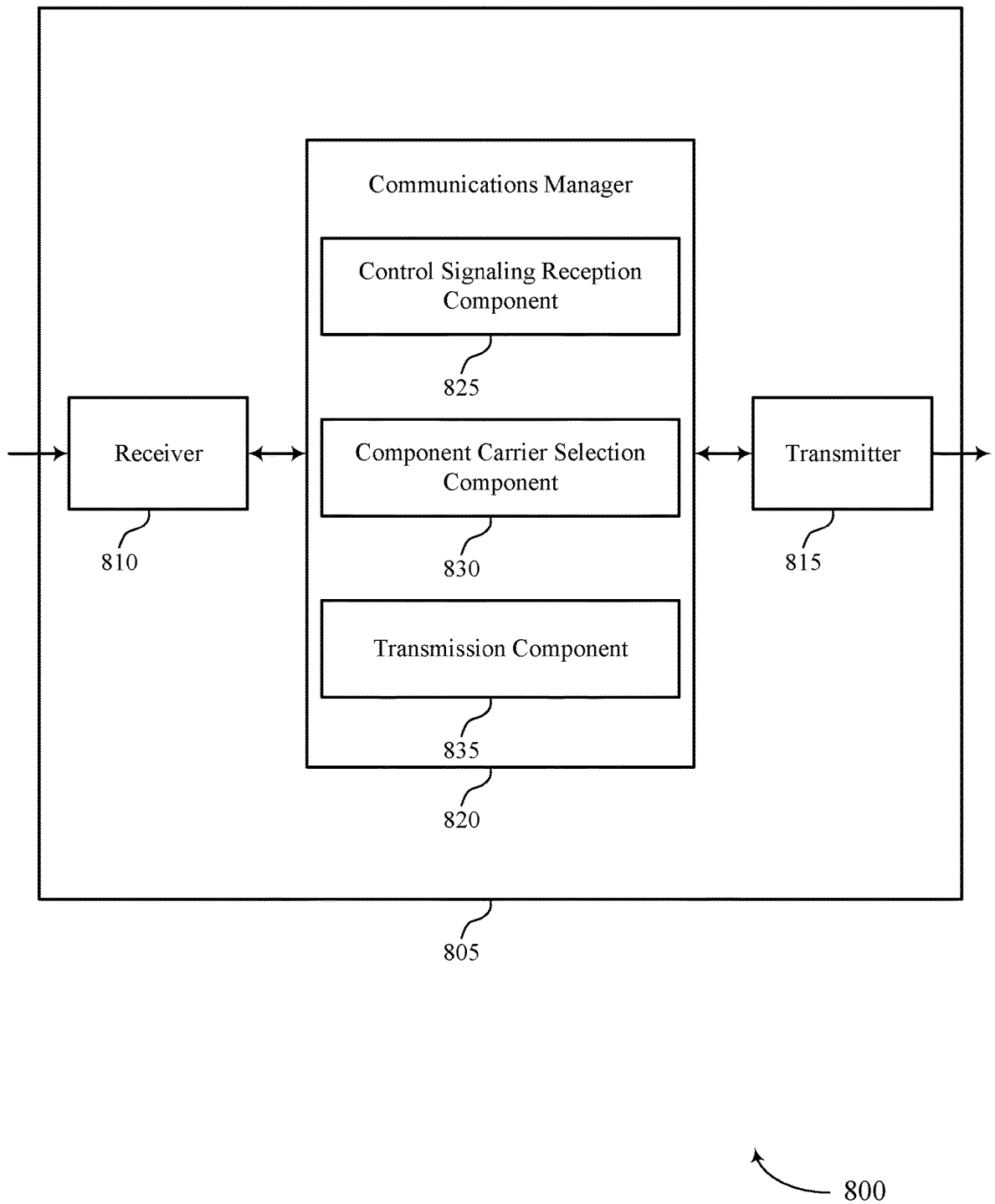

FIG. 8 shows a block diagram 800 of a device 805. The device 805 may be an example of aspects of a device 705 or a UE 115 as described herein. The device 805 may include a receiver 810, a transmitter 815, and a communications manager 820. The device 805 may also include a processor. Each of these components may be in communication with one another (e.g., via one or more buses).

The receiver 810 may provide a means for receiving information such as packets, user data, control information, or any combination thereof associated with various information channels (e.g., control channels, data channels, information channels related to resource selection methods for unaligned feedback transmissions for sidelink carrier aggregation). Information may be passed on to other components of the device 805. The receiver 810 may utilize a single antenna or a set of multiple antennas.

The transmitter 815 may provide a means for transmitting signals generated by other components of the device 805. For example, the transmitter 815 may transmit information such as packets, user data, control information, or any combination thereof associated with various information channels (e.g., control channels, data channels, information channels related to resource selection methods for unaligned feedback transmissions for sidelink carrier aggregation). In some examples, the transmitter 815 may be co-located with a receiver 810 in a transceiver module. The transmitter 815 may utilize a single antenna or a set of multiple antennas.

The device 805, or various components thereof, may be an example of means for performing various aspects of resource selection methods for unaligned feedback transmissions for sidelink carrier aggregation as described herein. For example, the communications manager 820 may include a control signaling reception component 825, a component carrier selection component 830, a transmission component 835, or any combination thereof. The communications manager 820 may be an example of aspects of a communications manager 720 as described herein. In some examples, the communications manager 820, or various components thereof, may be configured to perform various operations (e.g., receiving, monitoring, transmitting) using or otherwise in cooperation with the receiver 810, the transmitter 815, or both. For example, the communications manager 820 may receive information from the receiver 810, send information to the transmitter 815, or be integrated in combination with the receiver 810, the transmitter 815, or both to receive information, transmit information, or perform various other operations as described herein.

The communications manager 820 may support wireless communication at a user equipment in accordance with examples as disclosed herein. The control signaling reception component 825 may be configured as or otherwise support a means for receiving control signaling indicating a set of multiple component carriers of a sidelink channel and a set of multiple feedback channel configurations for the set of multiple component carriers. The component carrier selection component 830 may be configured as or otherwise support a means for selecting, based on the set of multiple feedback channel configurations, a subset of the set of multiple component carriers for transmission of a first sidelink message and a second sidelink message using a feedback channel alignment rule indicating to select component carriers having feedback channels aligned in time for at least a subset of a set of multiple transmission time intervals. The transmission component 835 may be configured as or otherwise support a means for transmitting the first sidelink message on a first component carrier of the subset and the second sidelink message on a second component carrier of the subset.

Figure 9:
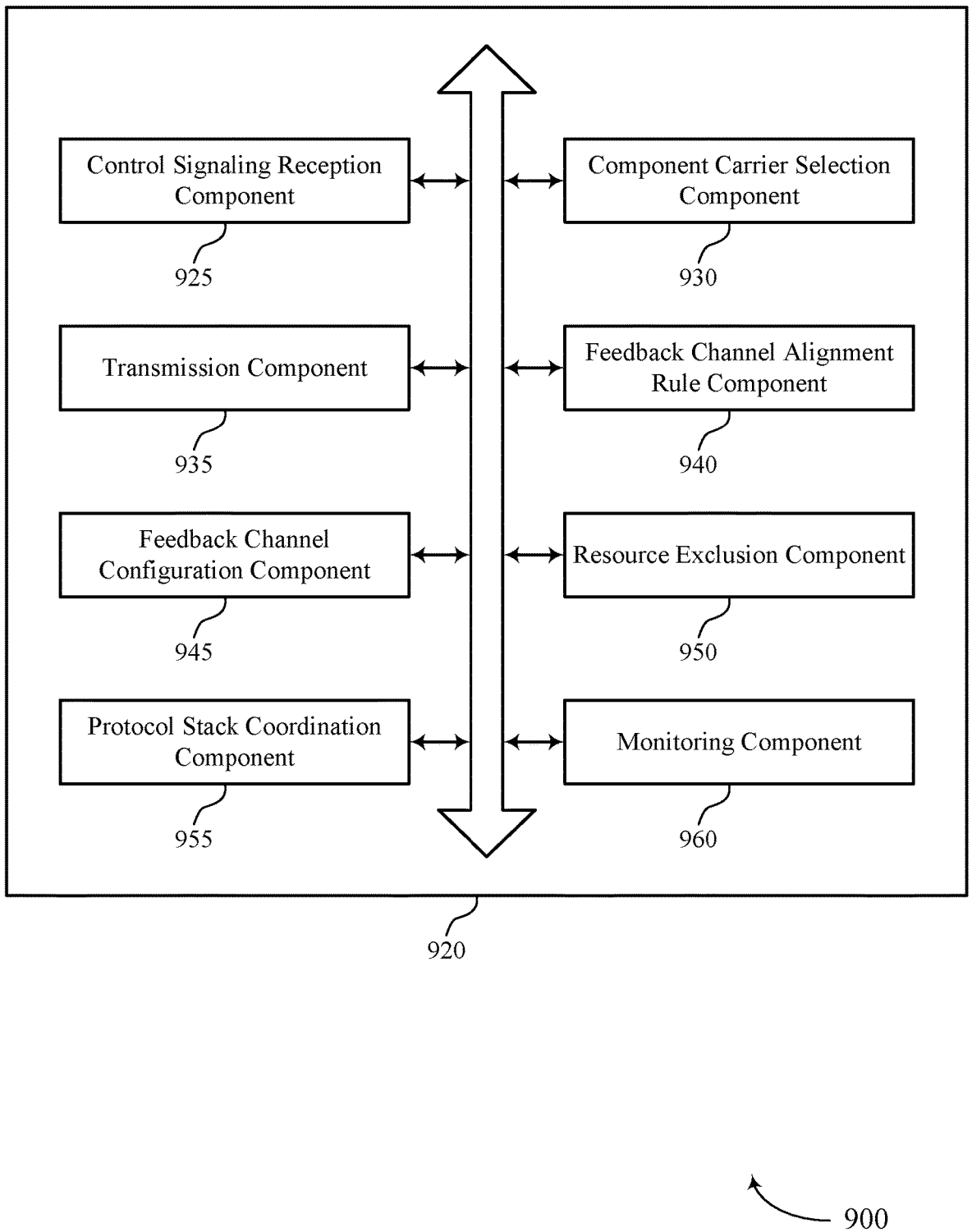
FIG. 9 shows a block diagram of a communications manager in accordance with aspects of the present disclosure.

FIG. 9 shows a block diagram 900 of a communications manager 920. The communications manager 920 may be an example of aspects of a communications manager 720, a communications manager 820, or both, as described herein. The communications manager 920, or various components thereof, may be an example of means for performing various aspects of resource selection methods for unaligned feedback transmissions for sidelink carrier aggregation as described herein. For example, the communications manager 920 may include a control signaling reception component 925, a component carrier selection component 930, a transmission component 935, a feedback channel alignment rule component 940, a feedback channel configuration component 945, a resource exclusion component 950, a protocol stack coordination component 955, a monitoring component 960, or any combination thereof. Each of these components may communicate, directly or indirectly, with one another (e.g., via one or more buses).

The communications manager 920 may support wireless communication at a user equipment in accordance with examples as disclosed herein. The control signaling reception component 925 may be configured as or otherwise support a means for receiving control signaling indicating a set of multiple component carriers of a sidelink channel and a set of multiple feedback channel configurations for the set of multiple component carriers. The component carrier selection component 930 may be configured as or otherwise support a means for selecting, based on the set of multiple feedback channel configurations, a subset of the set of multiple component carriers for transmission of a first sidelink message and a second sidelink message using a feedback channel alignment rule indicating to select component carriers having feedback channels aligned in time for at least a subset of a set of multiple transmission time intervals. The transmission component 935 may be configured as or otherwise support a means for transmitting the first sidelink message on a first component carrier of the subset and the second sidelink message on a second component carrier of the subset.

In some examples, the feedback channel alignment rule component 940 may be configured as or otherwise support a means for transmitting the first sidelink message on the first component carrier of the subset and the second sidelink message on the second component carrier of the subset based on the feedback channel alignment rule indicating to select at least two of the set of multiple component carriers that each have time-aligned feedback channels and a same feedback channel periodicity.

In some examples, the feedback channel configuration component 945 may be configured as or otherwise support a means for transmitting the first sidelink message on the first component carrier during a first transmission time interval and the second sidelink message on the second component carrier during the first transmission time interval based on a first feedback channel configuration of the first component carrier differing from a second feedback channel configuration of the second component carrier, and the first and second feedback channel configurations each indicating that the first transmission time interval has a same number of data symbols.

In some examples, the feedback channel configuration component 945 may be configured as or otherwise support a means for transmitting the first sidelink message on the first component carrier during a first transmission time interval and a third sidelink message on a third component carrier during the first transmission time interval based on a first feedback channel configuration of the first component carrier indicating that the first transmission time interval has a different number of data symbols than a second feedback channel configuration of the second component carrier and a same number of data symbols as a third feedback channel configuration of the third component carrier.

In some examples, the resource exclusion component 950 may be configured as or otherwise support a means for transmitting the first sidelink message on the first component carrier during a first transmission time interval and the second sidelink message on the second component carrier during a second transmission time interval based on a resource selection rule indicating to exclude a transmission resource during the first transmission time interval on the second component carrier that has a feedback channel when the first transmission time interval on the first component carrier does not include a feedback channel.

In some examples, the control signaling reception component 925 may be configured as or otherwise support a means for receiving a control message indicating the resource selection rule. In some examples, the resource selection rule is based on a priority of the first sidelink message relative to a priority of the second sidelink message. In some examples, the resource selection rule is based on a priority of the first sidelink message relative to a priority of a feedback message to be received via the feedback channel of the second component carrier. In some examples, the resource selection rule is based on a first channel busyness ratio of the first component carrier and a second channel busyness ratio of the second component carrier. In some examples, the resource selection rule is based on a resource exclusion pattern. In some examples, each feedback channel configuration indicates periodicity of a feedback channel on a respective component carrier of the set of multiple component carriers.

In some examples, the protocol stack coordination component 955 may be configured as or otherwise support a means for transmitting, from a medium access control layer to a physical layer, an indication of a sensing resource pool of the sidelink channel and of one or more transmission resource exclusions for the sensing resource pool. In some examples, the protocol stack coordination component 955 may be configured as or otherwise support a means for receiving, at the medium access control layer and from the physical layer, an indication of a first available resource on the first component carrier and a second available resource on the second component carrier based on the indication of the sensing resource pool and of the one or more transmission resource exclusions. In some examples, the transmission component 935 may be configured as or otherwise support a means for scheduling transmission of the first sidelink message on the first component carrier and transmission of the second sidelink message on the second component carrier based on the first available resource and the second available resource.

In some examples, the protocol stack coordination component 955 may be configured as or otherwise support a means for receiving, at a medium access control layer and from a physical layer, an indication of a first available resource on the first component carrier and a second available resource on the second component carrier. In some examples, the resource exclusion component 950 may be configured as or otherwise support a means for scheduling transmission of the first sidelink message on the first component carrier and transmission of the second sidelink message on the second component carrier based on excluding, at the medium access control layer, one or more transmission resources of the first available resource of the first component carrier, of the second available resource of the second component carrier, or both.

In some examples, the control signaling reception component 925 may be configured as or otherwise support a means for receiving the control signaling indicating the feedback channel alignment rule. In some examples, the monitoring component 960 may be configured as or otherwise support a means for monitoring a first feedback channel of the first component carrier for feedback for the first sidelink message, a second feedback channel of the second component carrier for feedback for the second sidelink message, or both.

Figure 10:
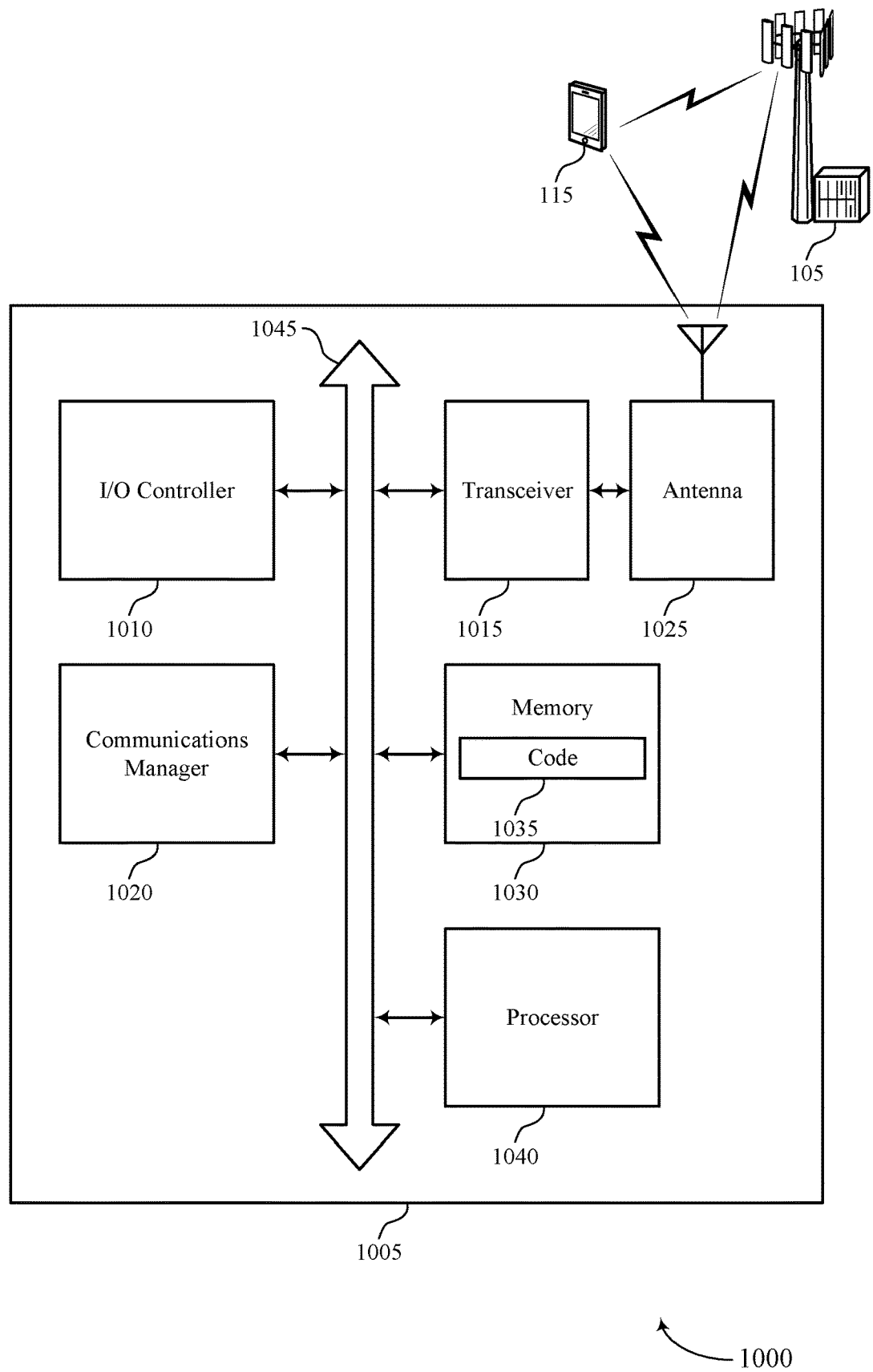
FIG. 10 shows a diagram of a system including a device in accordance with aspects of the present disclosure.

FIG. 10 shows a diagram of a system 1000 including a device 1005. The device 1005 may be an example of or include the components of a device 705, a device 805, or a UE 115 as described herein. The device 1005 may communicate wirelessly with one or more base stations 105, UEs 115, or any combination thereof. The device 1005 may include components for bi-directional voice and data communications including components for transmitting and receiving communications, such as a communications manager 1020, an input/output (I/O) controller 1010, a transceiver 1015, an antenna 1025, a memory 1030, code 1035, and a processor 1040. These components may be in electronic communication or otherwise coupled (e.g., operatively, communicatively, functionally, electronically, electrically) via one or more buses (e.g., a bus 1045).

The I/O controller 1010 may manage input and output signals for the device 1005. The I/O controller 1010 may also manage peripherals not integrated into the device 1005. In some cases, the I/O controller 1010 may represent a physical connection or port to an external peripheral. In some cases, the I/O controller 1010 may utilize an operating system such as iOS®, ANDROID®, MS-DOS®, MS-WINDOWS®, OS/2®, UNIX®, LINUX®, or another known operating system. Additionally or alternatively, the I/O controller 1010 may represent or interact with a modem, a keyboard, a mouse, a touchscreen, or a similar device. In some cases, the I/O controller 1010 may be implemented as part of a processor, such as the processor 1040. In some cases, a user may interact with the device 1005 via the I/O controller 1010 or via hardware components controlled by the I/O controller 1010.

In some cases, the device 1005 may include a single antenna 1025. However, in some other cases, the device 1005 may have more than one antenna 1025, which may be capable of concurrently transmitting or receiving multiple wireless transmissions. The transceiver 1015 may communicate bi-directionally, via the one or more antennas 1025, wired, or wireless links as described herein. For example, the transceiver 1015 may represent a wireless transceiver and may communicate bi-directionally with another wireless transceiver. The transceiver 1015 may also include a modem to modulate the packets, to provide the modulated packets to one or more antennas 1025 for transmission, and to demodulate packets received from the one or more antennas 1025. The transceiver 1015, or the transceiver 1015 and one or more antennas 1025, may be an example of a transmitter 715, a transmitter 815, a receiver 710, a receiver 810, or any combination thereof or component thereof, as described herein.

The memory 1030 may include random access memory (RAM) and read-only memory (ROM). The memory 1030 may store computer-readable, computer-executable code 1035 including instructions that, when executed by the processor 1040, cause the device 1005 to perform various functions described herein. The code 1035 may be stored in a non-transitory computer-readable medium such as system memory or another type of memory. In some cases, the code 1035 may not be directly executable by the processor 1040 but may cause a computer (e.g., when compiled and executed) to perform functions described herein. In some cases, the memory 1030 may contain, among other things, a basic I/O system (BIOS) which may control basic hardware or software operation such as the interaction with peripheral components or devices.

The processor 1040 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1040 may be configured to operate a memory array using a memory controller. In some other cases, a memory controller may be integrated into the processor 1040. The processor 1040 may be configured to execute computer-readable instructions stored in a memory (e.g., the memory 1030) to cause the device 1005 to perform various functions (e.g., functions or tasks supporting resource selection methods for unaligned feedback transmissions for sidelink carrier aggregation). For example, the device 1005 or a component of the device 1005 may include a processor 1040 and memory 1030 coupled to the processor 1040, the processor 1040 and memory 1030 configured to perform various functions described herein.

The communications manager 1020 may support wireless communication at a user equipment in accordance with examples as disclosed herein. For example, the communications manager 1020 may be configured as or otherwise support a means for receiving control signaling indicating a set of multiple component carriers of a sidelink channel and a set of multiple feedback channel configurations for the set of multiple component carriers. The communications manager 1020 may be configured as or otherwise support a means for selecting, based on the set of multiple feedback channel configurations, a subset of the set of multiple component carriers for transmission of a first sidelink message and a second sidelink message using a feedback channel alignment rule indicating to select component carriers having feedback channels aligned in time for at least a subset of a set of multiple transmission time intervals. The communications manager 1020 may be configured as or otherwise support a means for transmitting the first sidelink message on a first component carrier of the subset and the second sidelink message on a second component carrier of the subset.

By including or configuring the communications manager 1020 in accordance with examples as described herein, the device 1005 may support techniques for improved communication reliability, reduced latency, improved user experience related to reduced processing, reduced power consumption, more efficient utilization of communication resources, improved coordination between devices, longer battery life, improved utilization of processing capability, or a combination thereof.

In some examples, the communications manager 1020 may be configured to perform various operations (e.g., receiving, monitoring, transmitting) using or otherwise in cooperation with the transceiver 1015, the one or more antennas 1025, or any combination thereof. Although the communications manager 1020 is illustrated as a separate component, in some examples, one or more functions described with reference to the communications manager 1020 may be supported by or performed by the processor 1040, the memory 1030, the code 1035, or any combination thereof. For example, the code 1035 may include instructions executable by the processor 1040 to cause the device 1005 to perform various aspects of resource selection methods for unaligned feedback transmissions for sidelink carrier aggregation as described herein, or the processor 1040 and the memory 1030 may be otherwise configured to perform or support such operations.

Figure 11:
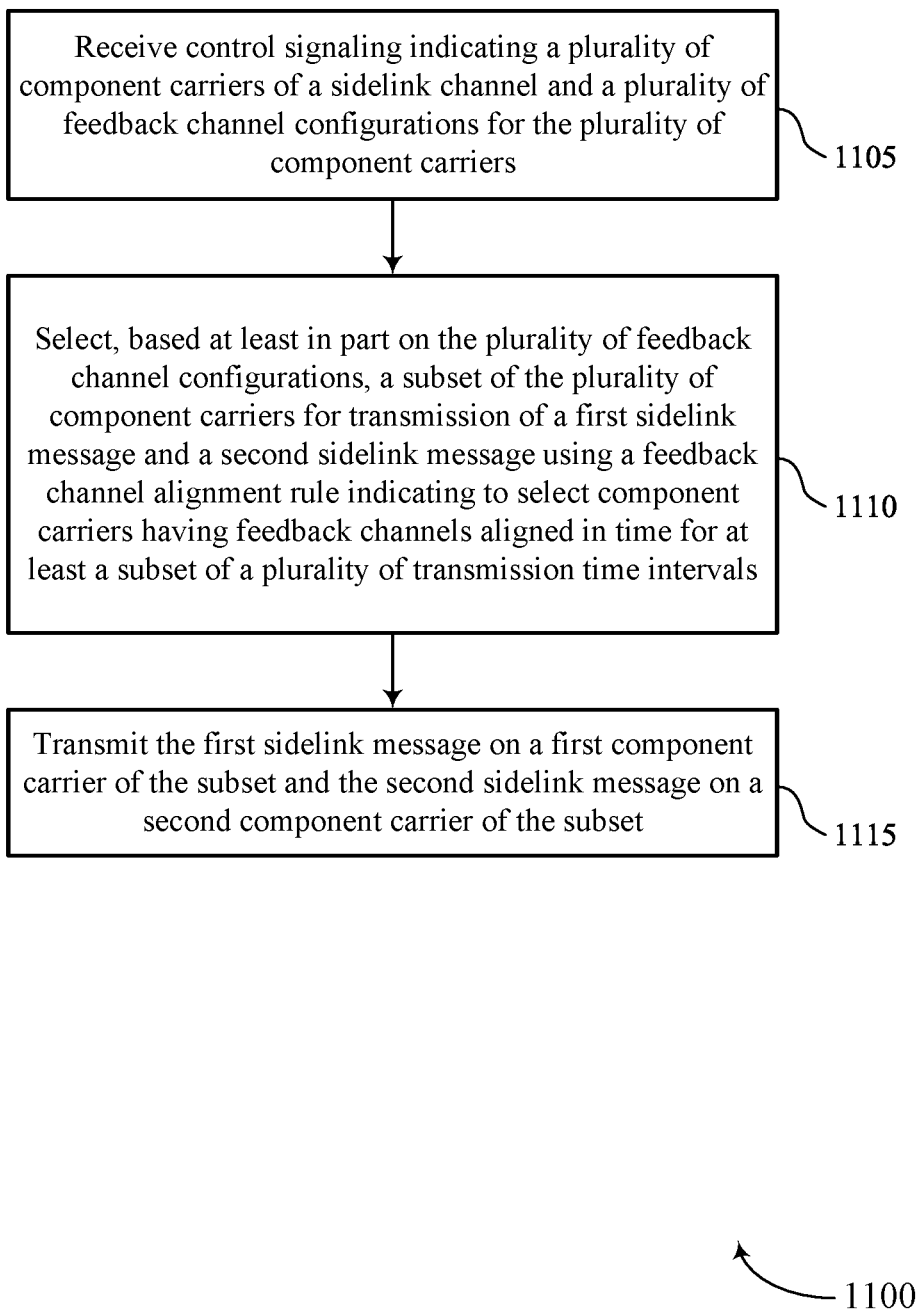
FIGS. 11 through 13 show flowcharts illustrating methods in accordance with aspects of the present disclosure.

FIG. 11 shows a flowchart illustrating a method 1100. The operations of the method 1100 may be implemented by a UE or its components as described herein. For example, the operations of the method 1100 may be performed by a UE 115 as described with reference to FIGS. 1 through 10. In some examples, a UE may execute a set of instructions to control the functional elements of the UE to perform the described functions. Additionally, or alternatively, the UE may perform aspects of the described functions using special-purpose hardware.

At 1105, the method may include receiving control signaling indicating a set of multiple component carriers of a sidelink channel and a set of multiple feedback channel configurations for the set of multiple component carriers. The operations of 1105 may be performed in accordance with examples as disclosed herein. In some examples, aspects of the operations of 1105 may be performed by a control signaling reception component 925 as described with reference to FIG. 9.

At 1110, the method may include selecting, based on the set of multiple feedback channel configurations, a subset of the set of multiple component carriers for transmission of a first sidelink message and a second sidelink message using a feedback channel alignment rule indicating to select component carriers having feedback channels aligned in time for at least a subset of a set of multiple transmission time intervals. The operations of 1110 may be performed in accordance with examples as disclosed herein. In some examples, aspects of the operations of 1110 may be performed by a component carrier selection component 930 as described with reference to FIG. 9.

At 1115, the method may include transmitting the first sidelink message on a first component carrier of the subset and the second sidelink message on a second component carrier of the subset. The operations of 1115 may be performed in accordance with examples as disclosed herein. In some examples, aspects of the operations of 1115 may be performed by a transmission component 935 as described with reference to FIG. 9.

Figure 12:
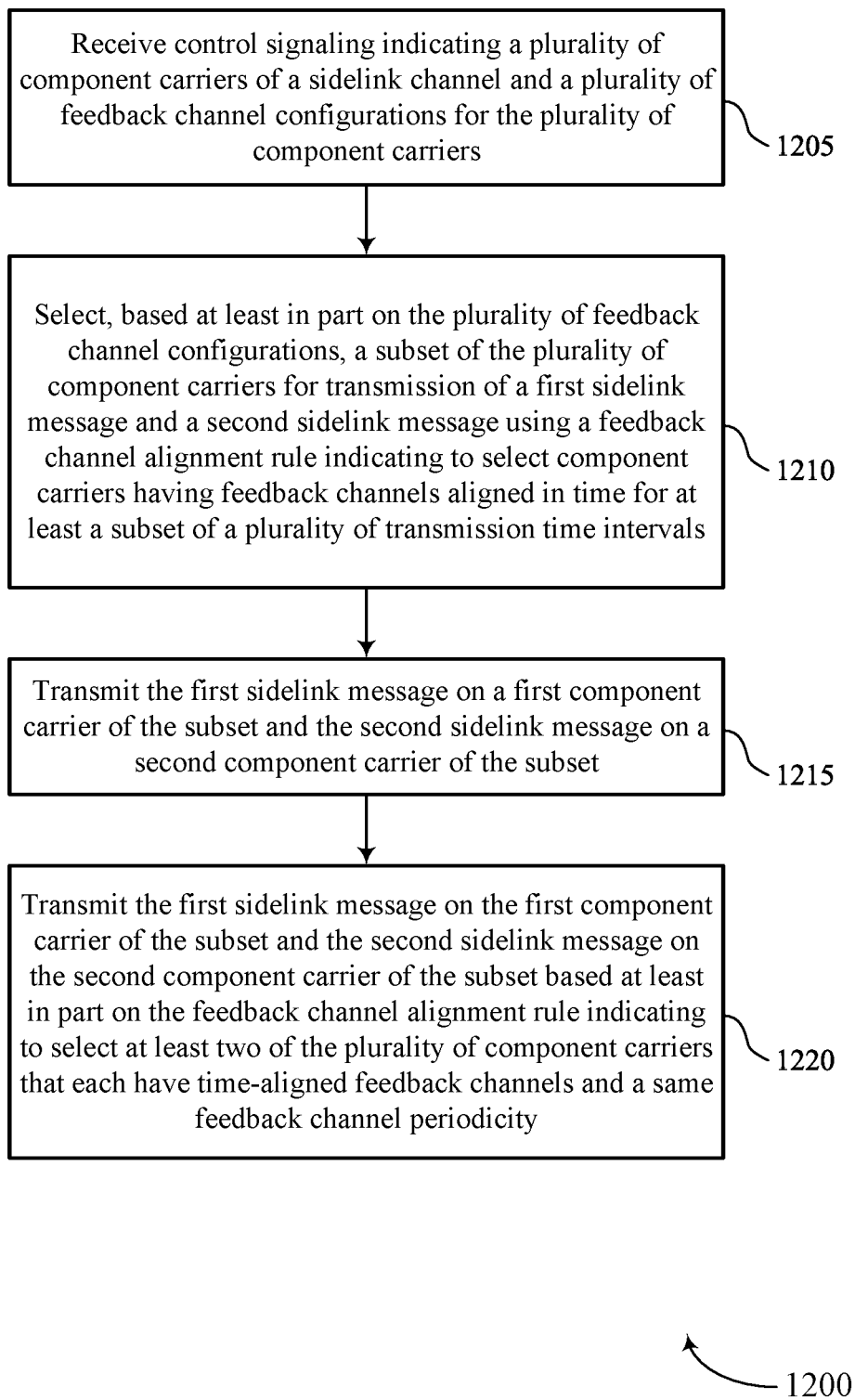

FIG. 12 shows a flowchart illustrating a method 1200. The operations of the method 1200 may be implemented by a UE or its components as described herein. For example, the operations of the method 1200 may be performed by a UE 115 as described with reference to FIGS. 1 through 10. In some examples, a UE may execute a set of instructions to control the functional elements of the UE to perform the described functions. Additionally, or alternatively, the UE may perform aspects of the described functions using special-purpose hardware.

At 1205, the method may include receiving control signaling indicating a set of multiple component carriers of a sidelink channel and a set of multiple feedback channel configurations for the set of multiple component carriers. The operations of 1205 may be performed in accordance with examples as disclosed herein. In some examples, aspects of the operations of 1205 may be performed by a control signaling reception component 925 as described with reference to FIG. 9.

At 1210, the method may include selecting, based on the set of multiple feedback channel configurations, a subset of the set of multiple component carriers for transmission of a first sidelink message and a second sidelink message using a feedback channel alignment rule indicating to select component carriers having feedback channels aligned in time for at least a subset of a set of multiple transmission time intervals. The operations of 1210 may be performed in accordance with examples as disclosed herein. In some examples, aspects of the operations of 1210 may be performed by a component carrier selection component 930 as described with reference to FIG. 9.

At 1215, the method may include transmitting the first sidelink message on a first component carrier of the subset and the second sidelink message on a second component carrier of the subset. The operations of 1215 may be performed in accordance with examples as disclosed herein. In some examples, aspects of the operations of 1215 may be performed by a transmission component 935 as described with reference to FIG. 9.

At 1220, the method may include transmitting the first sidelink message on the first component carrier of the subset and the second sidelink message on the second component carrier of the subset based on the feedback channel alignment rule indicating to select at least two of the set of multiple component carriers that each have time-aligned feedback channels and a same feedback channel periodicity. The operations of 1220 may be performed in accordance with examples as disclosed herein. In some examples, aspects of the operations of 1220 may be performed by a feedback channel alignment rule component 940 as described with reference to FIG. 9.

Figure 13:
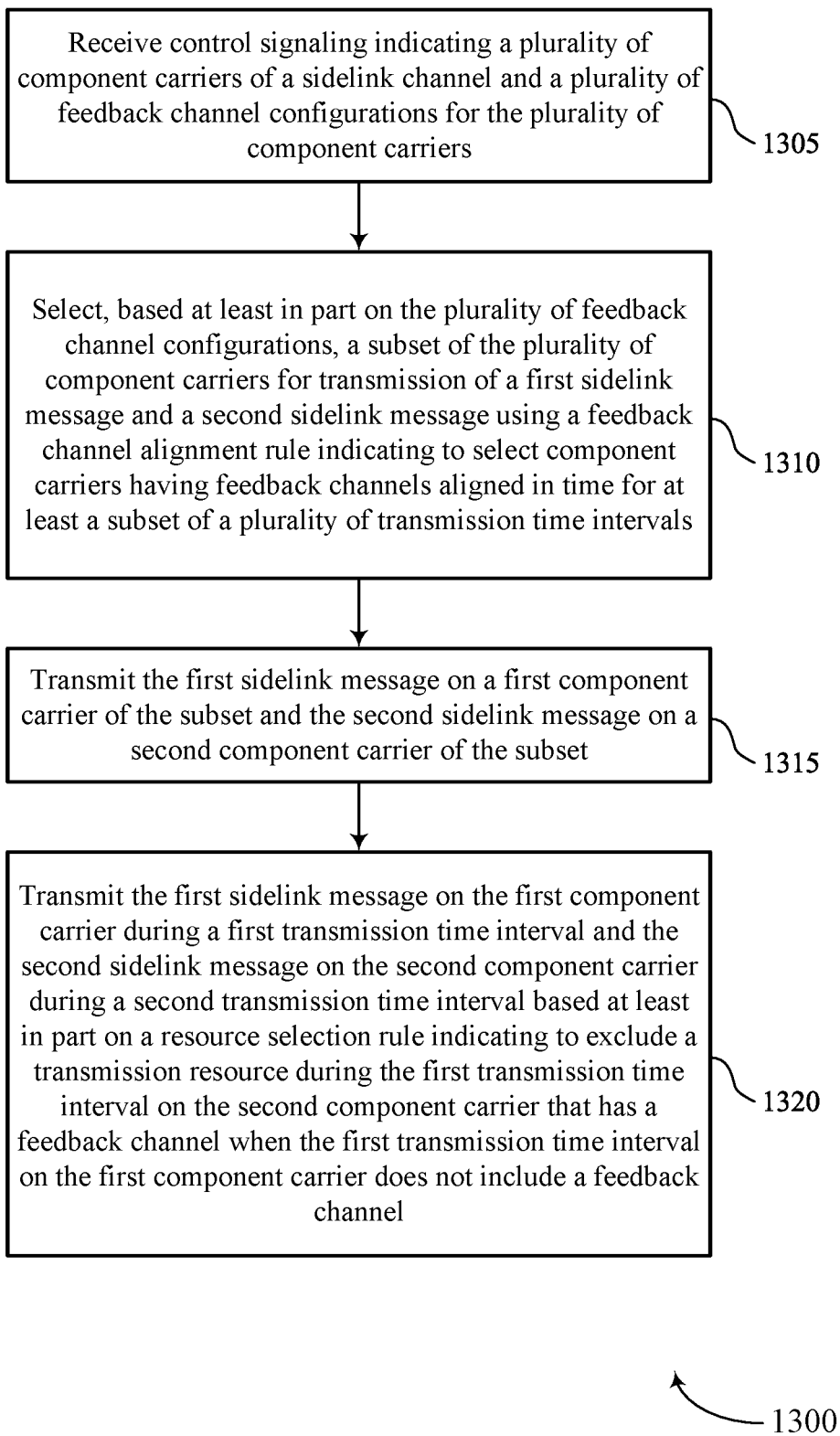

FIG. 13 shows a flowchart illustrating a method 1300. The operations of the method 1300 may be implemented by a UE or its components as described herein. For example, the operations of the method 1300 may be performed by a UE 115 as described with reference to FIGS. 1 through 10. In some examples, a UE may execute a set of instructions to control the functional elements of the UE to perform the described functions. Additionally, or alternatively, the UE may perform aspects of the described functions using special-purpose hardware.

At 1305, the method may include receiving control signaling indicating a set of multiple component carriers of a sidelink channel and a set of multiple feedback channel configurations for the set of multiple component carriers. The operations of 1305 may be performed in accordance with examples as disclosed herein. In some examples, aspects of the operations of 1305 may be performed by a control signaling reception component 925 as described with reference to FIG. 9.

At 1310, the method may include selecting, based on the set of multiple feedback channel configurations, a subset of the set of multiple component carriers for transmission of a first sidelink message and a second sidelink message using a feedback channel alignment rule indicating to select component carriers having feedback channels aligned in time for at least a subset of a set of multiple transmission time intervals. The operations of 1310 may be performed in accordance with examples as disclosed herein. In some examples, aspects of the operations of 1310 may be performed by a component carrier selection component 930 as described with reference to FIG. 9.

At 1315, the method may include transmitting the first sidelink message on a first component carrier of the subset and the second sidelink message on a second component carrier of the subset. The operations of 1315 may be performed in accordance with examples as disclosed herein. In some examples, aspects of the operations of 1315 may be performed by a transmission component 935 as described with reference to FIG. 9.

At 1320, the method may include transmitting the first sidelink message on the first component carrier during a first transmission time interval and the second sidelink message on the second component carrier during a second transmission time interval based on a resource selection rule indicating to exclude a transmission resource during the first transmission time interval on the second component carrier that has a feedback channel when the first transmission time interval on the first component carrier does not include a feedback channel. The operations of 1320 may be performed in accordance with examples as disclosed herein. In some examples, aspects of the operations of 1320 may be performed by a resource exclusion component 950 as described with reference to FIG. 9.

The following provides an overview of aspects of the present disclosure:

Aspect 1: A method for wireless communication at a user equipment, comprising: receiving control signaling indicating a plurality of component carriers of a sidelink channel and a plurality of feedback channel configurations for the plurality of component carriers; selecting, based at least in part on the plurality of feedback channel configurations, a subset of the plurality of component carriers for transmission of a first sidelink message and a second sidelink message using a feedback channel alignment rule indicating to select component carriers having feedback channels aligned in time for at least a subset of a plurality of transmission time intervals; and transmitting the first sidelink message on a first component carrier of the subset and the second sidelink message on a second component carrier of the subset.

Aspect 2: The method of aspect 1, further comprising: transmitting the first sidelink message on the first component carrier of the subset and the second sidelink message on the second component carrier of the subset based at least in part on the feedback channel alignment rule indicating to select at least two of the plurality of component carriers that each have time-aligned feedback channels and a same feedback channel periodicity.

Aspect 3: The method of any of aspects 1 through 2, further comprising: transmitting the first sidelink message on the first component carrier during a first transmission time interval and the second sidelink message on the second component carrier during the first transmission time interval based at least in part on a first feedback channel configuration of the first component carrier differing from a second feedback channel configuration of the second component carrier, and the first and second feedback channel configurations each indicating that the first transmission time interval has a same number of data symbols.

Aspect 4: The method of any of aspects 1 through 3, further comprising: transmitting the first sidelink message on the first component carrier during a first transmission time interval and a third sidelink message on a third component carrier during the first transmission time interval based at least in part on a first feedback channel configuration of the first component carrier indicating that the first transmission time interval has a different number of data symbols than a second feedback channel configuration of the second component carrier and a same number of data symbols as a third feedback channel configuration of the third component carrier.

Aspect 5: The method of any of aspects 1 through 4, further comprising: transmitting the first sidelink message on the first component carrier during a first transmission time interval and the second sidelink message on the second component carrier during a second transmission time interval based at least in part on a resource selection rule indicating to exclude a transmission resource during the first transmission time interval on the second component carrier that has a feedback channel when the first transmission time interval on the first component carrier does not include a feedback channel.

Aspect 6: The method of aspect 5, further comprising: receiving a control message indicating the resource selection rule.

Aspect 7: The method of any of aspects 5 through 6, wherein the resource selection rule is based at least in part on a priority of the first sidelink message relative to a priority of the second sidelink message.

Aspect 8: The method of any of aspects 5 through 7, wherein the resource selection rule is based at least in part on a priority of the first sidelink message relative to a priority of a feedback message to be received via the feedback channel of the second component carrier.

Aspect 9: The method of any of aspects 5 through 8, wherein the resource selection rule is based at least in part on a first channel busyness ratio of the first component carrier and a second channel busyness ratio of the second component carrier.

Aspect 10: The method of any of aspects 5 through 9, wherein the resource selection rule is based at least in part on a resource exclusion pattern.

Aspect 11: The method of any of aspects 1 through 10, wherein each feedback channel configuration indicates periodicity of a feedback channel on a respective component carrier of the plurality of component carriers.

Aspect 12: The method of any of aspects 1 through 11, further comprising: transmitting, from a medium access control layer to a physical layer, an indication of a sensing resource pool of the sidelink channel and of one or more transmission resource exclusions for the sensing resource pool; receiving, at the medium access control layer and from the physical layer, an indication of a first available resource on the first component carrier and a second available resource on the second component carrier based at least in part on the indication of the sensing resource pool and of the one or more transmission resource exclusions; and scheduling transmission of the first sidelink message on the first component carrier and transmission of the second sidelink message on the second component carrier based at least in part on the first available resource and the second available resource.

Aspect 13: The method of any of aspects 1 through 12, further comprising: receiving, at a medium access control layer and from a physical layer, an indication of a first available resource on the first component carrier and a second available resource on the second component carrier; and scheduling transmission of the first sidelink message on the first component carrier and transmission of the second sidelink message on the second component carrier based at least in part on excluding, at the medium access control layer, one or more transmission resources of the first available resource of the first component carrier, of the second available resource of the second component carrier, or both.

Aspect 14: The method of any of aspects 1 through 13, further comprising: receiving the control signaling indicating the feedback channel alignment rule.

Aspect 15: The method of any of aspects 1 through 14, further comprising: monitoring a first feedback channel of the first component carrier for feedback for the first sidelink message, a second feedback channel of the second component carrier for feedback for the second sidelink message, or both.

Aspect 16: An apparatus for wireless communication at a user equipment, comprising a processor; memory coupled with the processor; and instructions stored in the memory and executable by the processor to cause the apparatus to perform a method of any of aspects 1 through 15.

Aspect 17: An apparatus for wireless communication at a user equipment, comprising at least one means for performing a method of any of aspects 1 through 15.

Aspect 18: A non-transitory computer-readable medium storing code for wireless communication at a user equipment, the code comprising instructions executable by a processor to perform a method of any of aspects 1 through 15.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communication at a user equipment, comprising:
    receiving control signaling indicating a plurality of component carriers of a sidelink channel and a plurality of feedback channel configurations for the plurality of component carriers;
    selecting, based at least in part on the plurality of feedback channel configurations, a subset of the plurality of component carriers for transmission of a first sidelink message and a second sidelink message using a feedback channel alignment rule indicating to select component carriers having feedback channels aligned in time for at least a subset of a plurality of transmission time intervals; and
    transmitting the first sidelink message on a first component carrier of the subset and the second sidelink message on a second component carrier of the subset.

2. The method of claim 1, further comprising:
    transmitting the first sidelink message on the first component carrier of the subset and the second sidelink message on the second component carrier of the subset based at least in part on the feedback channel alignment rule indicating to select at least two of the plurality of component carriers that each have time-aligned feedback channels and a same feedback channel periodicity.

3. The method of claim 1, further comprising:
    transmitting the first sidelink message on the first component carrier during a first transmission time interval and the second sidelink message on the second component carrier during the first transmission time interval based at least in part on a first feedback channel configuration of the first component carrier differing from a second feedback channel configuration of the second component carrier, and the first and second feedback channel configurations each indicating that the first transmission time interval has a same number of data symbols.

4. The method of claim 1, further comprising:
    transmitting the first sidelink message on the first component carrier during a first transmission time interval and a third sidelink message on a third component carrier during the first transmission time interval based at least in part on a first feedback channel configuration of the first component carrier indicating that the first transmission time interval has a different number of data symbols than a second feedback channel configuration of the second component carrier and a same number of data symbols as a third feedback channel configuration of the third component carrier.

5. The method of claim 1, further comprising:
    transmitting the first sidelink message on the first component carrier during a first transmission time interval and the second sidelink message on the second component carrier during a second transmission time interval based at least in part on a resource selection rule indicating to exclude a transmission resource during the first transmission time interval on the second component carrier that has a feedback channel when the first transmission time interval on the first component carrier does not include a feedback channel.

6. The method of claim 5, further comprising:
    receiving a control message indicating the resource selection rule.

7. The method of claim 5, wherein the resource selection rule is based at least in part on a priority of the first sidelink message relative to a priority of the second sidelink message.

8. The method of claim 5, wherein the resource selection rule is based at least in part on a priority of the first sidelink message relative to a priority of a feedback message to be received via the feedback channel of the second component carrier.

9. The method of claim 5, wherein the resource selection rule is based at least in part on a first channel busyness ratio of the first component carrier and a second channel busyness ratio of the second component carrier.

10. The method of claim 5, wherein the resource selection rule is based at least in part on a resource exclusion pattern.

11. The method of claim 1, wherein each feedback channel configuration indicates periodicity of a feedback channel on a respective component carrier of the plurality of component carriers.

12. The method of claim 1, further comprising:
    transmitting, from a medium access control layer to a physical layer, an indication of a sensing resource pool of the sidelink channel and of one or more transmission resource exclusions for the sensing resource pool;
    receiving, at the medium access control layer and from the physical layer, an indication of a first available resource on the first component carrier and a second available resource on the second component carrier based at least in part on the indication of the sensing resource pool and of the one or more transmission resource exclusions; and scheduling transmission of the first sidelink message on the first component carrier and transmission of the second sidelink message on the second component carrier based at least in part on the first available resource and the second available resource.

13. The method of claim 1, further comprising:

receiving, at a medium access control layer and from a physical layer, an indication of a first available resource on the first component carrier and a second available resource on the second component carrier; and scheduling transmission of the first sidelink message on the first component carrier and transmission of the second sidelink message on the second component carrier based at least in part on excluding, at the medium access control layer, one or more transmission resources of the first available resource of the first component carrier, of the second available resource of the second component carrier, or both.

14. The method of claim 1, further comprising:

receiving the control signaling indicating the feedback channel alignment rule.

15. The method of claim 1, further comprising:

monitoring a first feedback channel of the first component carrier for feedback for the first sidelink message, a second feedback channel of the second component carrier for feedback for the second sidelink message, or both.

16. An apparatus for wireless communication at a user equipment, comprising:

a processor;

memory coupled with the processor; and instructions stored in the memory and executable by the processor to cause the apparatus to:

receive control signaling indicating a plurality of component carriers of a sidelink channel and a plurality of feedback channel configurations for the plurality of component carriers;

select, based at least in part on the plurality of feedback channel configurations, a subset of the plurality of component carriers for transmission of a first sidelink message and a second sidelink message using a feedback channel alignment rule indicating to select component carriers having feedback channels aligned in time for at least a subset of a plurality of transmission time intervals; and transmit the first sidelink message on a first component carrier of the subset and the second sidelink message on a second component carrier of the subset.

17. The apparatus of claim 16, further comprising a transmitter, wherein the instructions are further executable by the processor to cause the apparatus to:

transmit, via the transmitter, the first sidelink message on the first component carrier of the subset and the second sidelink message on the second component carrier of the subset based at least in part on the feedback channel alignment rule indicating to select at least two of the plurality of component carriers that each have time-aligned feedback channels and a same feedback channel periodicity.

18. The apparatus of claim 16, wherein the instructions are further executable by the processor to cause the apparatus to:

transmit the first sidelink message on the first component carrier during a first transmission time interval and the second sidelink message on the second component carrier during the first transmission time interval based at least in part on a first feedback channel configuration of the first component carrier differing from a second feedback channel configuration of the second component carrier, and the first and second feedback channel configurations each indicating that the first transmission time interval has a same number of data symbols.

19. The apparatus of claim 16, wherein the instructions are further executable by the processor to cause the apparatus to:

transmit the first sidelink message on the first component carrier during a first transmission time interval and a third sidelink message on a third component carrier during the first transmission time interval based at least in part on a first feedback channel configuration of the first component carrier indicating that the first transmission time interval has a different number of data symbols than a second feedback channel configuration of the second component carrier and a same number of data symbols as a third feedback channel configuration of the third component carrier.

20. The apparatus of claim 16, wherein the instructions are further executable by the processor to cause the apparatus to:

transmit the first sidelink message on the first component carrier during a first transmission time interval and the second sidelink message on the second component carrier during a second transmission time interval based at least in part on a resource selection rule indicating to exclude a transmission resource during the first transmission time interval on the second component carrier that has a feedback channel when the first transmission time interval on the first component carrier does not include a feedback channel.

21. The apparatus of claim 20, wherein the instructions are further executable by the processor to cause the apparatus to:

receive a control message indicating the resource selection rule.

22. The apparatus of claim 20, wherein the resource selection rule is based at least in part on a priority of the first sidelink message relative to a priority of the second sidelink message.

23. The apparatus of claim 20, wherein the resource selection rule is based at least in part on a priority of the first sidelink message relative to a priority of a feedback message to be received via the feedback channel of the second component carrier.

24. The apparatus of claim 20, wherein the resource selection rule is based at least in part on a first channel busyness ratio of the first component carrier and a second channel busyness ratio of the second component carrier.

25. The apparatus of claim 20, wherein the resource selection rule is based at least in part on a resource exclusion pattern.

26. The apparatus of claim 16, wherein each feedback channel configuration indicates periodicity of a feedback channel on a respective component carrier of the plurality of component carriers.

27. The apparatus of claim 16, wherein the instructions are further executable by the processor to cause the apparatus to:

transmit, from a medium access control layer to a physical layer, an indication of a sensing resource pool of the sidelink channel and of one or more transmission resource exclusions for the sensing resource pool;

receive, at the medium access control layer and from the physical layer, an indication of a first available resource on the first component carrier and a second available resource on the second component carrier based at least in part on the indication of the sensing resource pool and of the one or more transmission resource exclusions; and schedule transmission of the first sidelink message on the first component carrier and transmission of the second sidelink message on the second component carrier based at least in part on the first available resource and the second available resource.

28. The apparatus of claim 16, wherein the instructions are further executable by the processor to cause the apparatus to:

receive, at a medium access control layer and from a physical layer, an indication of a first available resource on the first component carrier and a second available resource on the second component carrier; and schedule transmission of the first sidelink message on the first component carrier and transmission of the second sidelink message on the second component carrier based at least in part on excluding, at the medium access control layer, one or more transmission resources of the first available resource of the first component carrier, of the second available resource of the second component carrier, or both.

29. An apparatus for wireless communication at a user equipment, comprising:

means for receiving control signaling indicating a plurality of component carriers of a sidelink channel and a plurality of feedback channel configurations for the plurality of component carriers;

means for selecting, based at least in part on the plurality of feedback channel configurations, a subset of the plurality of component carriers for transmission of a first sidelink message and a second sidelink message using a feedback channel alignment rule indicating to select component carriers having feedback channels aligned in time for at least a subset of a plurality of transmission time intervals; and means for transmitting the first sidelink message on a first component carrier of the subset and the second sidelink message on a second component carrier of the subset.

30. A non-transitory computer-readable medium storing code for wireless communication at a user equipment, the code comprising instructions executable by a processor to:

receive control signaling indicating a plurality of component carriers of a sidelink channel and a plurality of feedback channel configurations for the plurality of component carriers;

select, based at least in part on the plurality of feedback channel configurations, a subset of the plurality of component carriers for transmission of a first sidelink message and a second sidelink message using a feedback channel alignment rule indicating to select component carriers having feedback channels aligned in time for at least a subset of a plurality of transmission time intervals; and transmit the first sidelink message on a first component carrier of the subset and the second sidelink message on a second component carrier of the subset.

* * * * *